US011774264B2

(12) United States Patent
Aït-Mokhtar et al.

(10) Patent No.: US 11,774,264 B2
(45) Date of Patent: Oct. 3, 2023

(54) METHOD AND SYSTEM FOR PROVIDING INFORMATION TO A USER RELATING TO A POINT-OF-INTEREST

(71) Applicant: NAVER CORPORATION, Seongnam-si (KR)

(72) Inventors: Salah Aït-Mokhtar, Montbonnot-Saint-Martin (FR); Caroline Brun, Grenoble (FR); Agnes Sandor, Meylan (FR)

(73) Assignee: NAVER CORPORATION, Seongnam-si (KR)

( * ) Notice: Subject to any disclaimer, the term of this patent is extended or adjusted under 35 U.S.C. 154(b) by 459 days.

(21) Appl. No.: 16/790,048

(22) Filed: Feb. 13, 2020

(65) Prior Publication Data
US 2021/0254994 A1 Aug. 19, 2021

(51) Int. Cl.
G01C 21/36 (2006.01)
G06F 40/30 (2020.01)
(Continued)

(52) U.S. Cl.
CPC ...... G01C 21/3697 (2013.01); G01C 21/3611 (2013.01); G01C 21/3617 (2013.01);
(Continued)

(58) Field of Classification Search
CPC .. G06F 16/3344; G06F 16/338; G06F 16/387; G06F 16/90344; G06F 16/9038; G06N 3/08
See application file for complete search history.

(56) References Cited

U.S. PATENT DOCUMENTS 7,558,769 B2 7/2009 Scott et al.
2007/0078669 A1* 4/2007 Dave .................. G06Q 30/0282
705/347
(Continued)

FOREIGN PATENT DOCUMENTS

KR 10-2018-0009408 1/2018

OTHER PUBLICATIONS

Aciar, S., "Mining Context Information from Consumer's Reviews," CARS 2010, 5 pages.
(Continued)

Primary Examiner — Richard L Bowen
Assistant Examiner — Aryan D Toughiry
(74) Attorney, Agent, or Firm — Greer, Burns & Crain, Ltd.

(57) ABSTRACT

In methods and systems for providing information to a user relating to a point-of-interest (POI), a query is received via a communication network. A processor receives information relating to at least one POI based on the received query. The retrieved information comprises a set of retrieved POI tips relating to the POI. Each of the set of retrieved POI tips is previously extracted from POI free-text reviews and respectively associated in the data storage with one or more semantic categories based on a predefined tip ontology. The processor generates a user interface interactively displaying the retrieved POI tips and the semantic categories associated with each of the POI tips. The displayed POI tips are sorted by their associated displayed semantic categories. The generated user interface is transmitted to a computing device for display.

21 Claims, 10 Drawing Sheets

(51) Int. Cl.
    *G06F 16/387*    (2019.01)
    *G06F 16/33*    (2019.01)
    *G06F 16/338*    (2019.01)
    *G06F 16/903*    (2019.01)
    *G06F 16/9038*    (2019.01)
    *G06N 3/08*    (2023.01)

(52) U.S. Cl.
    CPC ....... *G01C 21/3679* (2013.01); *G06F 16/338* (2019.01); *G06F 16/3344* (2019.01); *G06F 16/387* (2019.01); *G06F 16/9038* (2019.01); *G06F 16/90344* (2019.01); *G06F 40/30* (2020.01); *G06N 3/08* (2013.01)

(56) References Cited

U.S. PATENT DOCUMENTS

| | | | |
|---|---|---|---|
| 2007/0078670 | A1 | 4/2007 | Dave et al. |
| 2014/0244651 | A1* | 8/2014 | Liu ............... G06F 16/2455 707/740 |
| 2014/0280230 | A1 | 9/2014 | Masato et al. |
| 2019/0005027 | A1* | 1/2019 | He ............... G06N 20/00 |
| 2019/0361987 | A1* | 11/2019 | Qiao ............... G06F 16/335 |
| 2020/0134388 | A1* | 4/2020 | Rohde ............... G06N 5/022 |
| 2021/0110439 | A1* | 4/2021 | Jayne ............... G06K 9/6256 |

OTHER PUBLICATIONS

Bauman, K., et al., "Discovering Contextual Information from User Reviews for Recommendation Purposes," CBRecSys 2014, 25 pages.

Brun, C., et al., "Suggestion Mining: Detecting Suggestions for Improvement in Users' Comments," Research in Computing Science 70, 2013, pp. 199-209.

Guy, I., et al., "Extracting and Ranking Travel Tips from User-Generated Reviews," WWW 2017, Perth, Australia, pp. 987-996.

Kushal, D.B., et al., "Mining the Peanut Gallery. Opinion Extraction and Semantic Classification of Product Reviews," WWW 2003, May 20-24, 2003, Budapest, Hungary, pp. 519-528. [[Need Copy]].

Hu, M., et al., "Mining Opinion Features in Customer Reviews," Proceedings of Nineteenth National Conference on Artificial Intelligence, 2004, 6 pages.

Kozawa, S., et al., "Advice Extraction from Web for Providing Prior Information Concerning Outdoor Activities," Itelligent Interactive Multimedia Systems and Services 11 ,2011, pp. 251-260.

Negi, S. et al., "Towards the Extraction of Customer-to-Customer Suggestions from Reviews," In Proceedings of the 2015 Conference on Empirical Methods in Natural Language Processing, 2015, pp. 2159-2167.

Wang, H., et al., "A Location-Sentiment-Aware Recommender System for Both Home-Town and Out-of-Town Users," Proceedings of the 23rd ACM SIGKDD International Conference on Knowledge Discovery and Data Mining, 2017, pp. 1135-1143.

Wicaksono, A., et al., "Toward Advice Mining: Conditional Random Fields for Extracting Advice-Revealing Text Units," Proceedings of the 22nd ACM International Conference on Information & Knowledge Management, 2013, pp. 2039-2048.

Wu, D., et al., "ReviewMiner: An Aspect-Based Review Analytics System," Proceedings of the 40th International ACM SIGIR Conference on Research and Development in Information Retrieval, 2017, pp. 1285-1288

Zhao, K., et al., "SAR: A Sentiment-Aspect-Region Model for User Preference Analysis in Geo-Tagged Reviews," 2015 IEEE 31st International Conference on Data Engineering, 2015, pp. 675-686.

\* cited by examiner

| Tip class | Examples |
|---|---|
| Accessibility and Physical Conditions | Part of the visit is possible only by a staircase of about a hundred steps. |
| For whom and with whom to visit | No need to dress up to in, just make sure you're 18+. Craft beef, seriously awesome games, this place is a gem for all nerds. |
| Cost and Mode of Payment | Visit costs 12 Euros. Book online for a 15% discount. |
| Visit Period / Time | Go when the kids are in school. Don't go during raining season. Too crowded over spring break. |
| What to Wear / How to Dress | Rinks are very cold don't forget your jacket. Stone beach, need shoes to swim. Dress appropriately, insanely hot. Mind the dress code. |
| What to Bring | You should also bring your own food, there aren't many food options. Having to have the passport checked every single time is a pain. |
| Onsite Facilities / Services | There is a gift shop which also sells some snack food and drinks. There are toilets and a small shop outside. |
| Onsite Activities | Taekwondo class held every Friday nite. There's a nice water fountain hiding by the picnic tables. Don't forget to check the celestial map! |

FIG. 3

METHOD AND SYSTEM FOR PROVIDING INFORMATION TO A USER RELATING TO A POINT-OF-INTEREST

TECHNICAL FIELD

The present disclosure relates to methods and systems for interactive search using computing devices, and more particularly, to providing an interactive search for points-of-interest (POIs).

BACKGROUND

It is known to provide map applications or other applications via a computing device where a user can search for and locate information regarding so-called points-of-interest (POIs). POIs include, but are not limited to, restaurants, parks, museums, tourist attractions, historical and cultural landmarks, hotels, etc.

For instance, there are many web and mobile applications dedicated to searching and retrieving POIs, including generic map applications (e.g., Google Maps, Bing, Naver Maps, etc.) and more specific websites or applications (e.g., TripAdvisor, Booking.com, Foursquare.com, etc.). Such web and mobile applications allow users to search for POIs such as restaurants, hotels, museums, parks, etc. In response to a search for a POI, certain information is automatically retrieved and presented to the user via a user interface.

However, the present inventors have discovered that certain relevant information related to searched POIs, including practical information that may be useful to either select a particular POI or assist with preparing a visit to the POI, may either not be automatically retrieved and presented using conventional POI web and mobile applications, or may be difficult to easily locate via a conventional POI search interface. Thus, users often need to use both the automatically generated results from conventional POI web and mobile applications and perform an additional, manual search to locate such practical information, which is inefficient.

SUMMARY

According to one aspect of the disclosed embodiments, methods are provided for providing information to a user relating to a point-of-interest (POI). A query is received via a communication network. A processor receives information from a data storage relating to at least one POI based on the received query, wherein the retrieved information comprises a set of retrieved POI tips relating to the at least one POI. Each of the set of retrieved POI tips is previously extracted from POI free-text reviews and respectively associated in the data storage with one or more semantic categories based on a predefined tip ontology. The processor generates a user interface interactively displaying the retrieved POI tips and the semantic categories associated with each of the retrieved POI tips, wherein the displayed POI tips are sorted by their associated displayed semantic categories. The generated user interface is transmitted to a computing device of the user via the communication network for display on the computing device.

According to another aspect of the disclosed embodiments, a system for providing information to a user relating to a point-of-interest (POI) includes a communication interface, a back-end including a processor, and a memory. The back-end includes a knowledge base, a tip identifier module, and an information retrieval module.

The tip identifier module is configured to identify tip occurrences in each of a plurality of POI free-text reviews using a natural language processing model, associate the identified tip occurrences with at least one semantic category based on a predefined tip ontology using the natural language processing model, and store the identified tip occurrences and their association with the at least one semantic category in the knowledge base. The information retrieval module is configured to retrieve information from the knowledge base relating to at least one POI in response to a received query, wherein the retrieved information comprises a set of the identified tip occurrences relating to the at least one POI and their respective associated semantic categories.

A front-end of the system includes a processor and memory, and comprises a POI query interface module, which is configured to receive the query via the communication interface, and a POI detail interface module which is configured to generate and transmit a user interface interactively displaying the retrieved POI tips and the semantic categories associated with each of the retrieved POI tips, wherein the displayed POI tips are sorted by their associated displayed semantic categories.

According to a complementary aspect, the present disclosure provides a computer program product, comprising code instructions to execute a method according to the previously described aspects; and a computer-readable medium, on which is stored a computer program product comprising code instructions for executing a method according to the previously described aspects.

DESCRIPTION OF THE DRAWINGS

The present disclosure will become more fully understood from the detailed description and the accompanying drawings, wherein:

FIG. 3 shows example semantic categories from an example tip ontology and associated example tip occurrences provided in text snippets from POI free-text reviews;

In the drawings, reference numbers may be reused to identify similar and/or identical elements.

DETAILED DESCRIPTION

Figure 1:
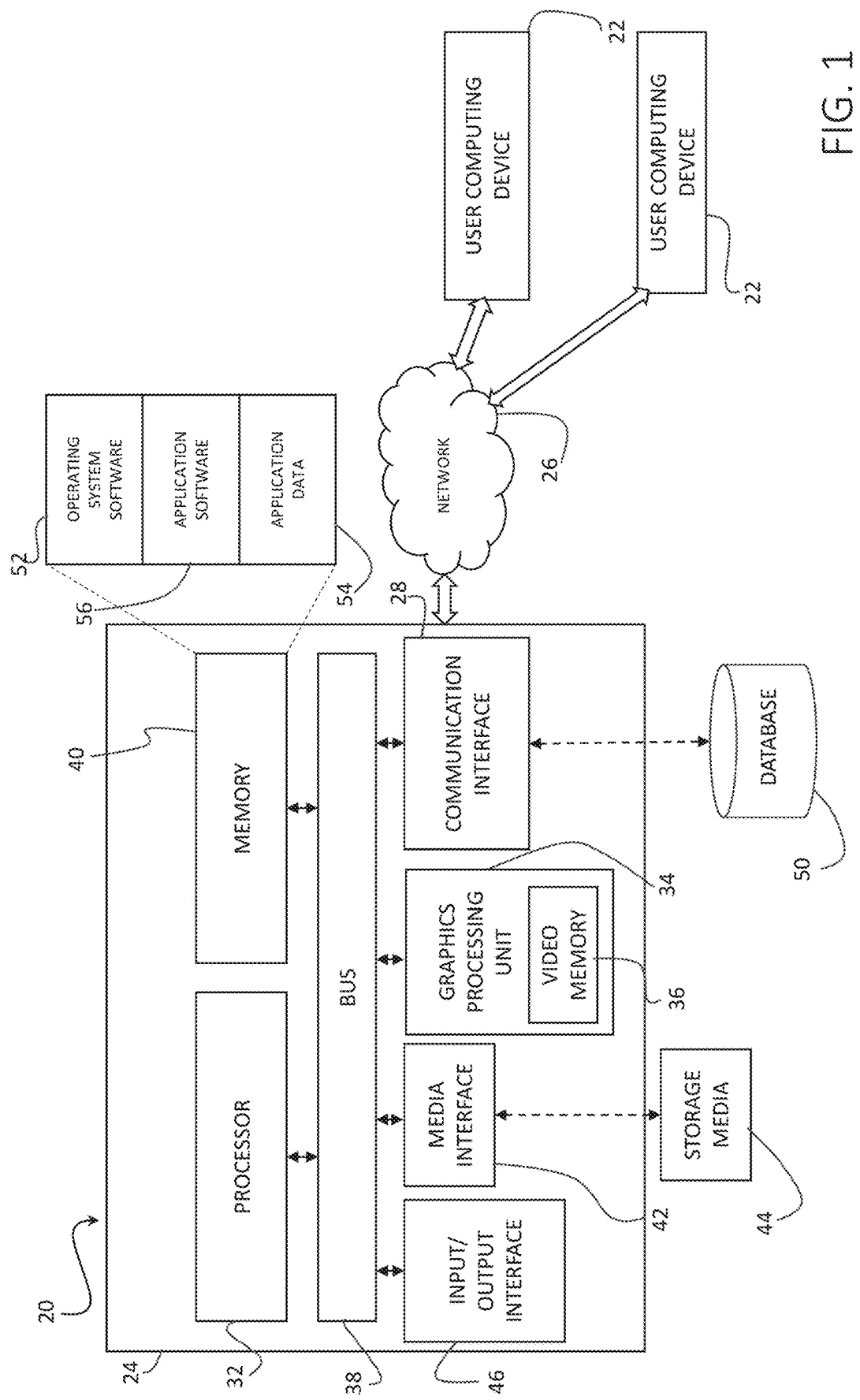
FIG. 1 illustrates an example of an example communication environment in which a method for providing information to a user relating to a point-of-interest (POI) to one or more user computing devices according to the present disclosure may be performed.

The present inventors have observed that POI information provided to users via conventional web and mobile applications is often limited to the content of particular POI knowledge bases (KBs). This POI information can include crowdsourced information (e.g., crowdsource tips in online guides) or inferred information from user data (e.g., an influx of visitors over time).

For example, conventional web and mobile applications for searching POIs typically provide access to two general types of information relating to the POIs. One general type is sentiment-based evaluations; that is, the users' subjective evaluations of the quality of a particular POI and its various aspects or facets. Sentiment-based evaluations help users choose a POI according to how well its general quality and/or the qualities of one or more of its aspects are (subjectively) rated. Such ratings are often directly entered by users via an interface of the web and mobile applications or an affiliated site.

The other general type of POI-related information that may be provided is factual and/or practical information about a particular POI. Nonlimiting examples of such information include the POI's address, geolocation, phone number, opening hours, how long a visit takes, how much it costs, etc. Factual and/or practical information helps users select a POI and/or prepare their visit appropriately to optimize their experience at the POI. This type of information is typically available in POI knowledge bases (KBs), which can include traditional POI databases containing standard POI-related information (e.g., name, geolocation, address, phone number or other contact information, length of typical visit, cost, opening hours, representative image, etc.), as well as crowdsourced information (e.g., Q/A results, or structured tips in online guides), as well as inferred information from users' personal data (e.g., a POI's "popular time" in a search engine).

In many cases, occurrences of this latter general type of POI-related information, providing additional and complementary items of useful information that can help users select a POI and perhaps prepare a visit, can also be found separately, such as in POI free-text reviews. As used herein, "free-text" (i.e., free-form text as opposed to structured text) means, in the context of POI reviews, textual information that may be freely entered by a reviewer that is not associated with a pre-defined category of information (e.g., a rating between one and five). Such items of useful information entered as free-text, though, are not easily selected and made directly accessible by conventional web or mobile POI search applications. Instead, users are required to manually review (e.g., read) the POI free-text reviews to locate these items. For example, in cases where there is only a limited amount of free-text that is displayed for each free-text review on a POI summary screen, users are required to individually select each POI free-text review in order to read the review in its entirety.

The information that is automatically provided by POI KBs and presented to a user via a conventional POI result interface is thus believed to be incomplete and/or cumbersome to access. Such automatically provided information particularly lacks a significant amount of the practical and/or factual information that users (potential visitors) may want to know to select and/or prepare a visit for a POI.

Coverage and presentation of conventional POI search results highly skews toward POI coverage of reviews (e.g., user reviews) as opposed to, say, crowdsourced tips and Q/A results. For instance, an example POI information result found by the present inventors in Google Maps for the POI Grotte de Choranche as of Nov. 15, 2018 included only eleven answered questions, while there were over 1066 reviews. Although many of these POI free-text reviews were short and did not contain any tips, the overwhelmingly large number of reviews as compared to the answered questions illustrated that these POI free-text reviews still included better POI tip coverage than the crowdsourced Q/A or tips.

Example tips that were found in such POI free-text reviews included: accessibility for disabled visitors, or parents with strollers, etc.; visitor profiles, e.g., age range, occupation profile, families, etc.; what to wear and how to dress during the visit; what accessories and items are necessary or helpful during the visit, e.g., ID or passport, food/water, sunblock, etc.; suitable visit periods/time, e.g., best-suited season or day(s) of the week, weather-related time, etc.; cost/prices of the POI visit; payment modes; whether booking is suitable or required, and how to book; etc. However, as mentioned above, such additional tips are not made easily and quickly accessible to users.

According to example embodiments provided herein, POI search methods and systems are provided that automatically identify and select items of relevant (e.g., practical and/or useful) POI information, referred to herein as tips, from POI free-text reviews (e.g., users' reviews of particular POIs). Further, example methods automatically group the tips into semantic categories and present the grouped tips to the user via a user interface. In this way, such items of relevant POI information can be made quickly, directly, and clearly accessible to users when they search for and select POIs, such as via a web or mobile application.

An example system includes a back-end service that combines the automatic identification of tips from the textual content of POI user reviews and the categorization of these tips into a predefined ontology of suggestion types. The system further includes a front-end service to the end-users (users) that allow them to quickly focus on, or search for, types of tips that interest them.

"Automatically" as used herein refers to example methods and systems processing POI free-text reviews, including identifying and classifying (and, preferably, storing) the tips as provided herein, without first requiring a request or prompt from a user searching for a POI. For example, POI free-text reviews may be processed individually as they are collected and/or stored in a data storage, such as a POI knowledge base (KB). Alternatively, POI free-text reviews may be processed in batches on a regular (e.g., periodic) basis after previously being collected and stored. In either event, the tips generated by POI free-text reviews, associated with semantic categories, are stored in advance of a user query for the associated POI so that the result presented to the user automatically include these tips, sorted (or arranged) by their associated semantic categories.

By contrast, in conventional POI result interfaces, users can view some standard POI information, and possibly view crowdsourced tips and Q/A results. However, to obtain the additional practical and useful information that can be gleaned from POI free-text reviews, users must essentially manually go through the POI free-text reviews and read them, which can be cumbersome and time-consuming.

In some conventional map applications, reviews can be ordered in different ways, including by so-called "relevance." In other example methods, certain suggestions may be extracted from text, but a simple binary decision (suggestion vs no suggestion) is made. Such reviews or suggestions are not semantically grouped, and further it is not possible to order them so that the reviews containing useful/practical information come first. Instead, such useful/practical information (e.g., information about price, onsite facilities/services (toilets, restaurant, shop)), and other useful tips, are buried in the middle or even the tail of a list or reviews so ordered by "relevance."

"Tips" as used herein generally refer to any practical information in a factual mode (practical or fact-based suggestions), contained in reviews of particular POIs provided in a free-text structure ("POI free-text reviews"), which can help users to select POIs, prepare a visit to POIs, etc. Generally, "tips" as used herein differ from, say, mere generic reviews or merely generic review aspects (that is, not specific to a POI) in that tips provide suggestions to the users (readers) regarding a particular POI. Further, tips differ from mere sentiment-based statements (e.g., subjective statements or opinions) in that tips are factual. In other words, a "tip" is not provided by mere subjective assessments of the POIs, such as the quality of particular POIs or their respective aspects. Such subjective assessments may be provided in, for instance, global or aspect-specific user rating scores, and/or taken into account by aspect-based sentiment analysis systems for a POI search. For example, a text statement such as "Very nice park!" would not be considered a "tip" as used herein. However, factual suggestions can be both explicit, such as "bring warm clothing," or implicit, such as "online booking gets a 15% discount" (in both cases, no sentiment is involved, and objective, factual information can be extracted).

In some conventional POI services and applications, by contrast, all user reviews and/or comments may be generally referred to as "tips" but are not considered tips as used in the present disclosure. For instance, a conventional POI service may include simple sentiment-based statements, or more general comments not specific to a particular POI, such as "It's with your feet that you move, but it's with your heart that you dance!" As another example, personal comments provided on a conventional POI service such as "Close to my church" that would not assist a (more general) user in selecting a POI and/or preparing a visit is not considered a tip as used herein.

While some conventional POI applications automatically select and display certain terms directly found in reviews, such terms do not consider semantic categories that can help a user navigate semantically and quickly access useful tips. For example, for the POI Grotte de Choranche, directly selected terms from a text may include items such as "great tour," "cave," "cathedral," "nature," etc. Some of these terms can be irrelevant or even misleading, such as "cathedral" (there is no cathedral, although there is an area inside the cave called "cathedral"), or "light jacket" (a warm jacket is more advisable because it is quite cold inside the cave). More significantly, such direct results are typically incomplete, as many terms/phrases related to useful tips are omitted by such selection, such as price, accessibility, onsite facilities/services, etc. To determine whether such directly-selected terms are relevant, accurate, or complete, a user searching for information may need to read the full context of each term within each review themselves, which is time-consuming.

While it is possible for a user to manually search POI free-text reviews with keywords to locate tips, this is a suboptimal solution, at least because: 1) one has to run multiple distinct queries for various semantic categories of tips (e.g., to determine how to dress for a particular POI, a user may have to provide queries for each of various terms for manners of dressing, such as "outerwear," "clothes," etc.); 2) even for a single tip category (e.g., onsite facilities), one has to enter multiple queries or multiple terms (e.g., a query for "restroom" may not yield any results, while one for "toilet" does); or 3) reviews for a particular POI typically do not contain all categories of tips, which will not be known by the user in advance of searching, and thus users end up wasting time searching with multiple keywords and queries for tips that may be absent from the reviews.

Embodiments of the present provide, among other things, methods and systems for providing information to a user relating to a point-of-interest (POI) in which, in response to a query via a communication network, a user interface displays POI tips retrieved from a data storage (such as but not limited a POI knowledge base (KB)), where such tips are: automatically selected from POI free-text reviews; automatically associated with one or more semantic categories based on a predefined tip ontology; and displayed in semantically categorized sets so that users can access them directly and selectively.

Presenting such information can be in addition to presenting so-called standard information and/or crowdsourced Q/A or tips conventionally provided by a retrieval from POI knowledge bases. "Crowdsourced tips" as used herein is intended to refer to structured tips that are created manually to fill in (populate) an explicit tip database, besides user reviews. Similarly, "Crowdsourced Q/A" is intended to refer to explicit questions/answers, for instance those created by users, for POIs.

An example end-to-end system can include, for instance, a back-end that stores a map with POIs and associated POI free-text reviews, where the back-end further analyzes the POI free-text reviews to extract tips and classifies them into an ontology. A front-end then presents the results via an interactive user interface for navigation, allowing a user to select among semantic tip categories, and among individual tips within the semantic tip categories. The interactive user interface can also include an interface displaying matching POIs in response to a user query, such as but not limited to a displayed map indicating matching POIs in response to the search. One or more matching POIs can then be selected to provide the user interface displaying the tips and semantic tip categories, preferably along with other POI-related information such as standard POI information.

In some example embodiments, the user can interact with tip results via the user interface in additional ways beyond selecting/deselecting. For example, the user interface may allow a user to provide feedback such as by rating the usefulness of tips, and this feedback can then be used to improve a tip identifier model.

In this way, when a user receives a point-of-interest (POI) in response to a query (and, possibly, a selection of the particular POI among other matching POIs), they can have quick access to structured data regarding this POI, as well as quick access to different types of information expressed in users' reviews (tips) through a semantically categorized menu of tips information. Significantly, the tips are categorized in semantic categories that a user can navigate to access the type of information that user is interested in. The user can thus directly access such information without, say, needing to separately read through user reviews, or to review search terms with keywords.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example computing environment incorporating a system 20 for providing information to a user relating to a point-of-interest (POI) to one or more user computing devices 22. The system includes a computer, such as but not limited to a server computer (server) 24, which may be connected over a network 26 via one or more communication interfaces 28 to one or more user computing devices 22, which may, but need not, act as clients.

A computer can be embodied in the server computer 24 as shown in FIG. 1, or may be embodied in a local computer, a client computer, a personal computer, a mobile communication device (e.g., a portable phone or other computing device, personal digital assistant, wearable device, embedded processor, augmented reality device, virtual reality device, etc.), or any other suitable computing device that can be configured to perform methods disclosed herein, or any combination of computing devices.

The example network 26 may be embodied in one or more of a wireless network or a wired network, such as but not limited to a local area network (LAN or WLAN), a wide area network (WAN or WWAN), the Internet, a telecommunications network such as a public switched telephone network (PSTN), landline network, Ethernet or fiber network, a radio network such as a frequency-hopping spread spectrum (FHSS) radio network, GPRS network, Wi-Fi (e.g., 802.11) network, Wi-Max (e.g., 802.16) network, TCP/IP network, CDMA network, or network including any combination of the above.

Each of the communication interfaces 28 may be software and/or hardware associated in communicating to other devices. The communication interfaces 28 may be of one or different types that include a user interface, USB, Ethernet, Wi-Fi, wireless, RF, optical, cellular, or any other communication interface coupled to the network.

The computer 24 includes a processor 32, which may include one or more of a general purpose processor, a special purpose processor, a conventional processor, a digital signal processor (DSP), a virtual processor executed by one or more additional processors, a plurality of microprocessors operating in series or in parallel, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and others. The processor 32 may perform one or a combination of signal coding, data processing, power control, input/output processing, and/or any other functionality that enables the computer 24 and/or the system to operate in accordance with its intended functionality. Reference to a "processor" herein is intended to likewise refer to either a single processor, or to one or more processors operating in series and/or in parallel.

The computer 24 may further include a graphics interface, including a graphics processing unit (GPU) 34, video memory 36, and/or video interface (not shown). These components may cooperate to display graphics and text on a video monitor, such as a display (not shown). A GPU 34 may additionally or alternatively provide all or a portion of a processor.

The processor 32 may receive, generate, and process data as provided in one or more methods disclosed herein. In operation, the processor 32 may fetch, decode, and execute one or more instructions, and transfer information to and from other resources via a transfer path of the computer, such as a system bus 38. An example system bus 38 connects example components in the computer 24 and can define the medium for data exchange. A system bus 38 typically includes data lines for sending data, address lines for sending addresses, and control lines for sending interrupts and for operating the system bus. A nonlimiting example of such a system bus 38 is or includes a PCI (Peripheral Component Interconnect) bus.

The computer 24 further includes a memory 40, which may include computer-readable storage media in the form of volatile and/or nonvolatile memory such as read only memory (ROM), EEPROM, and RAM. A basic input/output system (BIOS), containing basic routines as will be appreciated by those ordinary skilled in the art, may be stored in ROM. RAM may contain, for instance, data, data tables, and/or modules (e.g., program modules) that are immediately accessible to and/or presently being operated on by the processor 32.

The computer 24 may also include, receive, or interface (e.g., via a media interface 42) with computer-readable storage media 44. Computer readable storage media 44 include volatile and nonvolatile, removable and non-removable media implemented in any non-transitory (i.e., tangible or physical) method or technology for storage of information, but such computer readable storage media do not merely include signals. Nonlimiting examples include RAM, ROM, EEPROM, flash memory or other memory technology, disk drives such as a hard disk drive (HDD), magnetic disk drives, magnetooptical disk drives, optical disk drives such as CD-ROM, BD-ROM, and digital versatile disks (DVD).

Other example computer storage media 44 includes, but are not limited to, magnetic tape cassettes, flash memory cards, digital versatile disks, digital video tape, solid state RAM, solid state ROM, etc. Such drives and their associated computer storage media can provide storage of computer readable instructions, data structures, program modules and other data for the computer 24.

The computer 24 may include one or more input devices (not shown) for entering commands and information into the computer. Example input devices include keyboards, buttons, pointing devices, trackball, touch pads, touch screens, dials, microphones, joysticks, game pads, satellite dishes, scanners, and others. These and other input devices can be connected to the processor 32 through a suitable user input/output interface 46 coupled to the system bus 38, or by other interface and bus structures, such as a parallel port, game port or a universal serial bus (USB). The computer 24 may connect to the network 26 through the communication interface 28, such as but not limited to a network interface or adapter.

It will be understood that any or all of the apparatuses, systems, methods and processes described herein may be embodied in the form of computer executable instructions (i.e., program code) stored on a computer-readable storage medium (e.g., a non-transitory computer-readable storage medium), which instructions, when executed by a processor such as the processor 32, cause the processor to perform and/or implement the systems, methods and processes described herein. Specifically, any of the steps, operations or functions described herein may be implemented in the form of such computer executable instructions, executing on the processor of a computer, or apparatus or system including such a computer. Reference herein to any method is intended to also be a reference (to the extent practicable) to processes incorporating such methods or any portion thereof, to apparatuses or systems implementing such methods or any portion thereof, or to computer executable instructions stored on a computer-readable storage medium which instructions, when executed by the processor, cause the processor to perform and/or implement such methods or any portion thereof.

The example system 20 preferably, but not necessarily, includes a database 50. The database 50, if provided, may be in communication with the computer 24 or incorporated within the computer. The database 50 includes memory such as any of the memory 40 mentioned above, and can include a processor for executing database software embodied in computer executable instructions. The database software can be made available to the processor of the database 50 in similar or different manner to other computer executable instructions herein.

The memory 40 preferably includes (e.g., stores) operating system software 52, data, e.g., application data 54, that can be processed by the processor, and application software 56, e.g., one or more modules containing computer-executable instructions for causing the processor 32 to process the data according to example methods herein. Data stored in the memory 40 or a portion thereof can additionally or alternatively be stored in the database 50, or stored in the database and transferred (e.g., loaded) into the memory.

Figure 2:
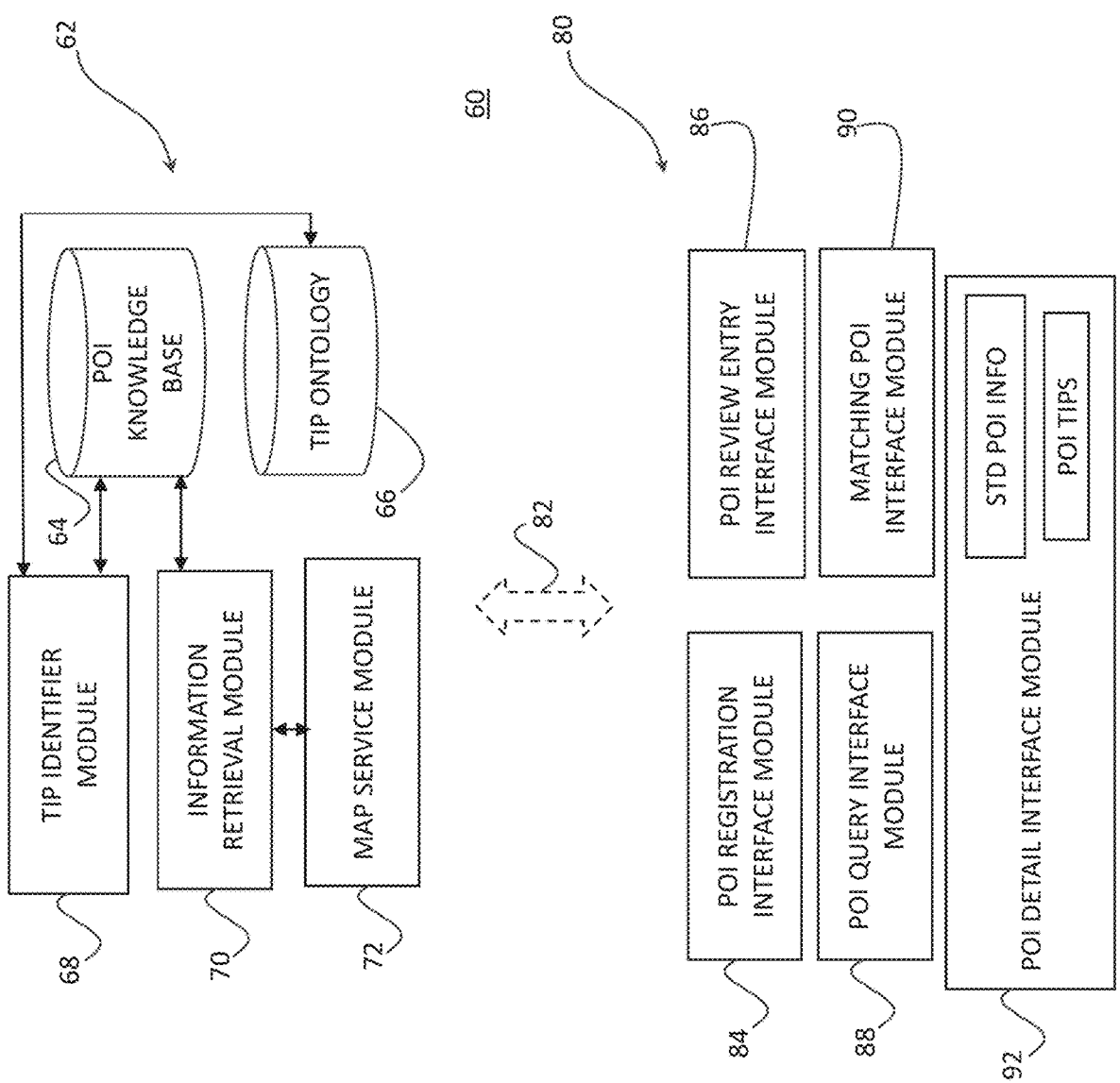
FIG. 2 sets forth an example architecture for a system for providing information to a user relating to a point-of-interest (POI) method according to the present disclosure.

FIG. 2 shows an example architecture 60, e.g., global architecture, for carrying out various inventive methods. The architecture 60 can be embodied by one or more modules embodied in the processor 32 (or another suitable processor) and the memory 40 (and/or another suitable memory) as configured by executable instructions, such as but not limited to the application software 56 in combination with the application data 54.

The example architecture 60 includes a back-end 62 including a data storage such as but not limited to a POI knowledge base (KB) 64, a tip ontology database 66, a tip identifier module 68, an information retrieval module 70, and a map service module 72. The example POI KB 64, which may be embodied in database 50, application data 54, or in any other suitable storage, includes various types of POI information stored therein. Nonlimiting examples of POI information include standard POI information, such as but not limited to POI name, geolocation, address, phone number, website URL or other locator information, POI category (and/or subcategories), images. Further, the POI KB 64 preferably includes information such as global and/or aspect-based user ratings and free-text reviews, crowd-sourced tips and Q/A. Additionally, according to example embodiments, the POI KB 64 (and/or other data storage) includes stored tips that are automatically extracted from the POI free-text reviews.

The example tip ontology 66, which may be embodied in database 50, application data 54, or in any other suitable storage, and may be a component of or in addition to the POI KB 64, includes an ontology of tip semantic categories or classes. Semantic categories as used herein refer to categories or classes for POI tips that are based, preferably entirely, on the semantics of the tips. The tip ontology 66 can be embodied in a simple flat set of semantic classes, a hierarchical set with a set of main (top) classes and subclasses, or any combination. More than one ontology (set) can be provided.

FIG. 3 shows an example of a flat tip ontology 74, with various tip ontology classes (tip classes) 76 and tip examples 78 for each tip class. The example tip ontology classes 76 shown in FIG. 3 include: Accessibility and Physical Conditions; For whom and with whom to visit; Cost and Mode of Payment; Visit Period/Time; What to Wear/How to Dress; What to Bring; Onsite Facilities/Services; and Onsite Activities. It will be appreciated that the tip classes 76 and tip examples 78 shown in in FIG. 3 are merely illustrative, and that many other tip classes may be used to classify tips and other tip examples are possible.

The example tip identifier module 68 includes a processing component, such as a natural language processing (NLP) component or components, which implements a tip identifier model that may be embodied in, for instance, an NLP model. The tip identifier module 68 employs the tip identifier model to automatically process POI free-text reviews to identify tip occurrences in the POI free-text reviews, and classifies the identified tips according to one or more of the determined tip ontology classes, such as those stored in the tip ontology 66. This extracts such tips from the POI free-text reviews for later retrieval. The extracted tip occurrences are then preferably associated with (e.g., indexed by), at least a unique identifier for the POI (POI UID), a unique identifier (UID) identifying the source of a POI free-text review from which the tip was extracted, and by tip labels (categories), and stored in the POI KB 64.

As an example of such automatic processing, POI free-text reviews may be processed by the tip identifier module 68 as they are added to the POI KB 64 for retrieval during a POI search. Alternatively or additionally, POI free-text reviews can be obtained separately and added to the POI KB 64. "As" can refer to being either before, during, or after the POI free-text review is added to the POI KB 64, but preferably takes place prior to being prompted or requested to do so by a user. This processing can occur as individual POI free-text reviews are added, or can occur in batches.

The example information retrieval module 70 is configured to retrieve information from the POI KB 64 relating to at least one POI, particularly a matching POI in response to a received query. This retrieved information includes at least a set of the identified tip occurrences (tips) relating to the at least one POI and their respective associated semantic categories. To retrieve this information, the information retrieval module 70 searches (preferably efficiently) all or a portion of the POI KB 64 data, including the automatically extracted tip occurrences, and in some example embodiments the POI free-text reviews, which preferably are associated with particular POIs, such as via a data structure. Example methods for searching the POI KB 64 include but are not limited to standard information retrieval techniques as used in search engines (e.g., Lucene or ElasticSearch), and others that will be appreciated by those of ordinary skill in the art.

The map service module 72 is configured to generate a user interface, such as a map interface, providing a visualization of one or more POIs retrieved during a search of the POI KB 64 by the information retrieval module 70 in response to a user query for POIs. The map service module 72 preferably generates a map including locations of the retrieved POIs for selection by the user.

A front-end 80 of the global architecture 60 provides (e.g., generates and transmits) a user interface for interacting with users. The front-end 80 connects to the back-end 62, e.g., via an interface such as but not limited to a representational state transfer application programming interface (REST API) 82.

A POI registration interface module 84 generates a front-end user interface (UI) for allowing a user to register new POIs. A POI review entry interface module 86 generates a front-end UI for allowing a user to enter new reviews, or revise or delete existing reviews, for existing POIs.

To receive a query, for instance a query for a POI from a user computing device 22 via the communication interface 38, the front-end 80 includes a POI query interface module 88 that generates and transmits a front-end UI. An example front-end UI for receiving a query includes an interactive POI search form (e.g., a standard search form or other search form) for querying POIs, as will be appreciated by those of ordinary skill in the art.

To present results in response to the received query, the front-end 80 further preferably includes a matching POI interface module 90 and a POI detail interface module 92. The matching POI interface module 90 generates and transmit an interactive user interface interactively displaying at least a portion of a retrieved set of matching POIs. These displayed matching POIs can, for instance, be displayed on a map as provided by the map service module 72. Alternatively or additionally, the matching POIs can be presented in list form, or in other formats. Preferably, the displayed matching POIs in the user interface are individually selectable (via any suitable method) to provide one or more POI detail interfaces generated and transmitted by the POI detail interface module 92, examples of which are provided below.

Figure 4:
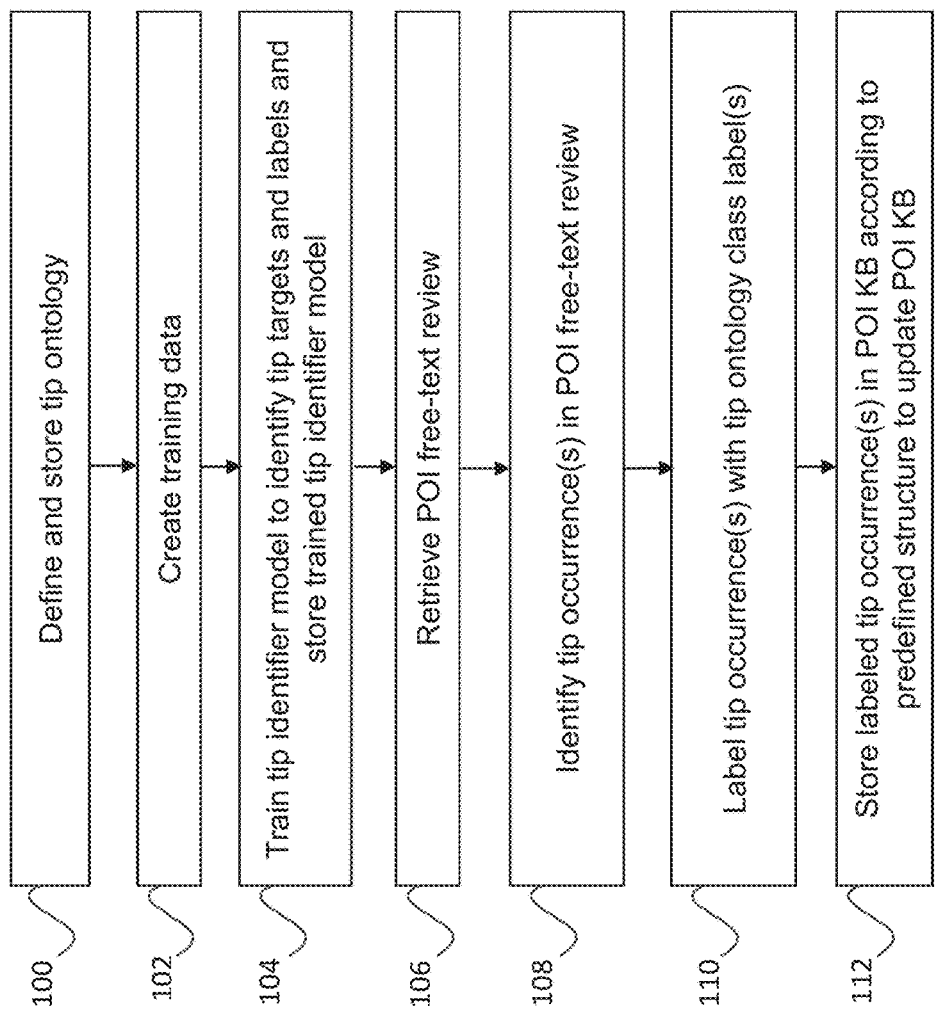
FIG. 4 shows an example method for populating a POI knowledge base (KB) with POI tip occurrences from POI free-text reviews, according to an inventive embodiment.

FIG. 4 shows an example method for populating a data storage, such as the POI KB 64, with tips extracted from POI free-text reviews. Steps in an example method can be performed, for instance, by the tip identifier module 68 operating in communication with the POI KB and the tip ontology 66. The tip identifier module 68 generally employs a trained tip identifier model, e.g., a trained NLP model, to identify occurrences of tips in POI free-text reviews, labels the identified occurrences of tips with one or more semantic categories (e.g., from tip ontology 66), and stores the extracted tips and their association with the one or more semantic categories in the data storage.

In an example method, the identification and labeling of tip targets by the tip identifier module 68 is presented as a sequence labeling problem. As such, the identification and labeling can be implemented using sequence labeling techniques, such as those disclosed in https://arxiv.org/abs/1603.01354. However, it is contemplated that other methods can be used.

In particular example methods, the tip identifier model is implemented using supervised learning and a neural multi-label classifier. Alternatively, the tip identifier model can be implemented using a rule-based method.

Referring to FIG. 4, the tip ontology can be defined and stored (step 100). The semantic categories populating the example tip ontology 66 can be defined either manually, such as by receiving semantic categories as one or more inputs from any suitable source, and/or can be defined automatically or semi-automatically, such as but not limited to by using known techniques for mining and clustering topics or concepts from any suitable source such as but not limited to POI reviews. Example methods for defining an ontology are disclosed in https://arxiv.org/abs/1903.04360. Other example methods for performing these techniques will be appreciated by those of ordinary skill in the art. The tip ontology 66 may be updated or supplemented similarly. The defined tip ontolog(ies) 66 can be stored in any suitable data storage.

Using the defined classes of the tip ontology, training data for the tip identifier model is generated (step 102), e.g., created, implemented using hand-crafted rules, implemented using unsupervised learning techniques, etc. In an example method, occurrences of tips in a set of randomly sampled reviews are annotated, e.g., manually annotated, to create the training data. In a particular method, spans of text strings or tokens, e.g., words, are annotated (identified, with the result preferably being stored at least temporarily) denoting the core element of the tip (that is, semantically, the relevant word(s) conveying the core meaning(s) of the particular tip), as opposed to the entire sentence where the tip occurs. These annotated spans of words are referred to herein as "tip targets." Manual annotation can be provided by, for instance, receiving data input by any suitable method and from any source indicating identified tip targets and associated classes of the tip ontology.

Referring again to the tip ontology shown in FIG. 3, the associated tip example 78 for each example tip ontology class (tip class) 76 includes one or more spans of words (emphasized using a bolt font) denoting the core element of the tip, which spans of words are identified as example tip targets. For instance, for the tip class Accessibility and Physical Conditions, the tip example labeled with that tip class is "Part of the visit is possible only by a STAIRCASE of about a hundred steps." The tip target "staircase" (emphasized in FIG. 3) is annotated within the tip example, as it directly conveys particular practical and factual information under the semantic category Accessibility and Physical Conditions. Similarly, for the tip class "Cost and Mode of Payment," the example tip example "Visit costs 12 EUROS. Book online for a 15% DISCOUNT" is provided, with the spans "12 EUROS" and "15% DISCOUNT" annotated as tip targets, as each convey particular practical and factual information under the semantic category "Cost and Mode of Payment." Strings of text (e.g., words, phrases, sentences, etc.) in POI free-text reviews may include multiple tip targets labeled with different semantic categories. Further, the same string of text, or overlapping strings of text, can be labeled with multiple semantic categories.

The created training dataset thus preferably includes multiple POI free-text reviews each associated with zero, one, or more tip occurrences and their manually associated (e.g., annotated) semantic category labels. Reviews that do not contain any tip occurrence (and hence, no annotated spans) preferably also form part of the created training dataset. The latter reviews are considered as negative examples, so that the tip identifier model can learn to avoid identifying tip occurrences in reviews or groups of tokens (e.g., sentences) that do not contain tip occurrences.

Using the created training dataset, the tip identifier model, e.g., a neural model, is trained to identify tip targets and their corresponding semantic category labels from POI free-text reviews (step 104). Then, the trained tip identifier module receives new POI free-text reviews (step 106), identifies occurrences of tips (tip occurrences) in the received POI free-text reviews (step 108), and labels the identified tip occurrences with selected tip ontology class labels to associate the identified tip occurrences with the semantic categories (step 110). The labeled tip occurrences are then stored in the POI KB (step 112).

Figure 5:
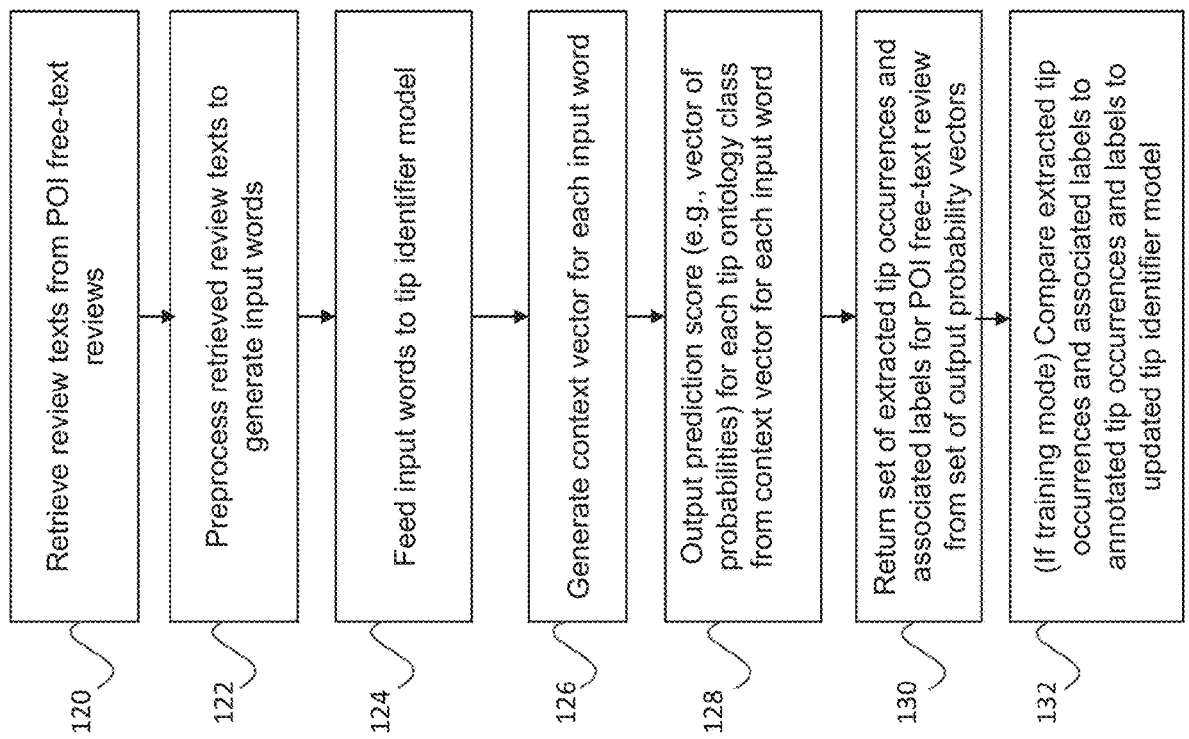
FIG. 5 shows an example method for identifying and labeling tip occurrences from POI free-text reviews using a natural language processing model.

FIG. 5 shows steps in an example method for employing a tip identifier model to identify and label tip targets. The POI free-text reviews can be received from any source (step 120). For training the tip identifier model, for instance, the POI free-text reviews may be received from the created training dataset. For populating the POI KB (or further populating the POI KB), the POI free-text reviews input into the (trained) tip identifier model may be received from sources including but not limited to POI free-text reviews that may be used in a POI KB for presenting to a user in other contexts or interfaces. For example, free-text reviews are typically (but not necessarily) user-generated; that is, generated by users of POI search systems that enter reviews and ratings for the POIs that they have visited. Such free-text reviews are stored as texts in the POI KB.

The received POI free-text review texts may be preprocessed with a tokenizer with or without initial processing with a sentence segmenter (step 122). Nonlimiting example tokenizers and sentence segmenters include spaCy (https://spacy.io/api/tokenizer) and TokenizeProcessor (https://stanfordnlp.github.io/stanfordnlp/tokenize.html), or those disclosed in https://cl.lingfil.uu.se/~marie/undervising/textanalys16/TokeninsationSegmentation.pdf. The tokenizer and (if used) sentence segmenter provide sequences of tokens (words, punctuation symbols, etc.), represented with pretrained word embeddings. Context vectors are generated, e.g., for each token (e.g., word) (step 124).

For example, a multi-label word classifier can be implemented in the tip identifier model. In an example multi-label word classifier, the input words of each sentence are fed into a recurrent neural network (RNN) such as but not limited to a bidirectional long short-term memory architecture (BiLSTM) augmented with a self-attention mechanism. An example BiLSTM architecture is disclosed in https://arxiv.org/abs/1603.01354, which is incorporated herein by reference.

The resulting context vector of each word is then connected to a feedforward network that outputs a generated prediction score for each of the predefined semantic categories (step 126). For example, the feedforward network can output a vector of probabilities for each of the predefined tip ontology classes.

The prediction score, e.g., vector of probabilities, can then be used to provide a set of extracted tip occurrences and their associated semantic category labels (step 128). For example, for each word, the vector of probabilities can be compared to one or more thresholds to determine whether the word should be identified as a tip occurrence that is associated with one or more of the semantic categories represented by the vector of probabilities. If the determined probability exceeds (or meets or exceeds) the threshold for one or more particular semantic categories, the corresponding word is added to a set of extracted (identified) tip occurrences that is associated (labeled) with such semantic categor(ies). If the tip identifier model is merely being trained, the extracted tip occurrences and associated labels can be compared to the annotated tip occurrences and labels, and the result of this comparison can be used to update the tip identifier model (step 130). Nonlimiting example training methods are disclosed in Ian Goodfellow et al., 6.5 Back-Propagation and Other Differentiation Algorithms, Deep Learning, MIT Press (2016), pp. 200-220, which is incorporated herein by reference. Otherwise, the set of labeled tip occurrences is then stored in the data storage (step 112) (FIG. 4).

Preferably, the example process of identifying and classifying tips in POI free-text review runs only once for each review, as soon as it is available, and returns a set of labeled tip occurrences. The tip identifier module 68 then stores the labeled tip occurrences for the review in the data storage, such as the POI KB, to update the data storage.

A tip occurrence preferably is stored in the form of a predefined structure, an example of which can include one or more of the following fields, in any combination: the character-based start/end offsets of the tip target in the text of the POI free-text review; the character-based start/end offsets of the sentence where it occurs; the set of predicted tip semantic category labels; a unique identifier (ID) of the POI, and a unique ID of the POI free-text review. All extracted tip occurrences are preferably thus indexed on at least the POI unique ID and the tip class labels. They are preferably stored in the POI KB 64 along with the associated POI free-text reviews themselves and with other POI information such as the standard POI information and/or other example information disclosed herein.

Using the above methods, for example, tips are automatically selected from free-text reviews and grouped into semantic categories. In response to a query, these tips can then be retrieved and presented via a user interface, preferably along with other POI-related information, to provide useful information to the user relating to the POI.

Figure 6:
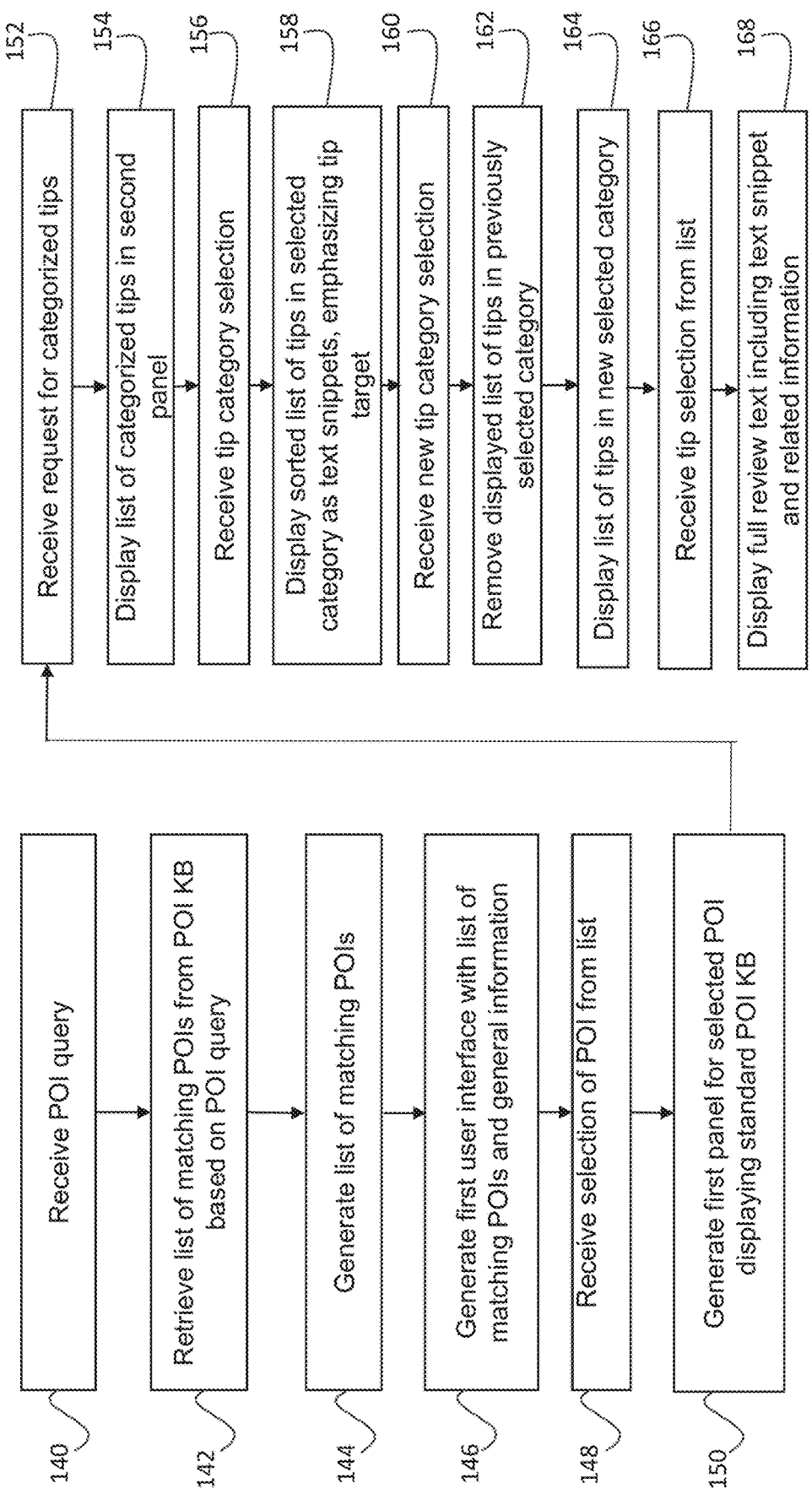
FIG. 6 shows an example method for presenting information to a user relating to a point-of-interest (POI), including POI tip occurrences and associated semantic categories, in response to a POI query, via a user interface.

FIG. 6 shows steps in an example method for providing information to a user relating to a POI, including retrieving and presenting categorized POI tips, in response to a user's query, e.g., a query for a POI matching certain input criteria such as during a POI search and exploration (though such tips may be generated in response to other queries). The query is received (step 140), e.g., via the communication network 26 via a search interface, such as but not limited to those used for conventional POI searches (e.g., standard POI search forms), which may be provided by the POI query interface module 88.

The received query can be processed, e.g., parsed, by the information retrieval module 70 using methods known to those of ordinary skill in the art for information searching. The information retrieval module 70 searches the data storage, such as the POI KB 64, and retrieves matching POIs based on the processed query (step 142). It will be appreciated that "matching" need not require an exact match with any particular part of the received or processed query, only that the resulting POIs relate to the received or processed query to provide a potentially relevant result.

In an example method, the matching POI interface module 90 generates matching POIs, e.g., a list of matching POIs (step 144), and transmits to the user an initial matching POI user interface (initial interface) presenting, e.g., displaying, one or more of the matching POIs (step 146). Preferably, each of the displayed POIs in the matching POI user interface is selectable by the user, either individually or as one or more groups. The format for the matching POI user interface can vary, and a specific format is not required. For instance, the matching POI user interface can be a formatted interactive list, displayed on one or more interactive panels.

Alternatively or additionally, the map service module 72 can retrieve a map (not shown) corresponding to one or more of the list of matching POIs, and the matching POI interface module 90 can generate, as part of the matching POI user interface, a user interface incorporating the retrieved map, preferably displaying the matching POIs thereon (such as with appropriate icons, pins, etc.). A subset of the matching POIs may be viewable at the same time, which subset may be updated as the user interacts with the map interface (e.g., scrolling, zooming, etc.) The matching POIs may be selectable from the map and/or from other formatted portions of the matching POI user interface.

The initial interface may include the displayed list of matching POIs (or a selectable portion thereof), preferably along with one or more items of basic information (e.g., POI name, rating, representative image, etc.). This displayed basic information preferably aids a user in generally reviewing the list of matching POIs and making a selection among them to request more detailed information. The initial interface is preferably easily and intuitively navigable by the user to review the displayed matching POIs and make a POI selection therefrom.

The matching POI interface module 90 receives a user selection of one or more POIs from the displayed matching POI list (step 148), such as by the user selecting (e.g., clicking) a corresponding icon, widget, link, etc. on the presented initial interface. In response to the received POI selection, the information retrieval module 70 searches for and retrieves more detailed information from the POI KB that is associated with the selected POI(s). It is also contemplated that this search for more detailed information can occur at least in part during the initial search for matching POIs, and stored in memory for later retrieval by the information retrieval module 70 in response to the received POI selection.

The POI detail interface module 92 then generates an additional user interface (a POI detail interface) presenting, e.g., displaying, more detailed POI information about the selected POI(s) using the additional information retrieved from the POI KB (step 150). This POI detail interface may be displayed on a separate screen (e.g., separate page, tab, or document) from the POI matching user interface, may be concurrently displayed with the POI matching user interface, may be incorporated within the POI matching user interface, may be superimposed on the POI matching user interface, or may otherwise be presented. Any suitable transition (or none at all) between the POI matching user interface and the POI detail interface may be provided.

Preferably, the POI detail interface includes at least a first user interface portion, e.g., a first panel (not shown), including displayed standard information for one or more of the selected POIs. The first panel can include, for example, a formatted list of standard POI information, such as but not limited to a POI's address, phone number, website URL (if any), geolocation, map visualization, representative image, ratings, etc. The first panel (or other user interface) may also include one or more displayed sections to view and/or access user reviews, and crowdsource Q/A and tips, if any. The first panel (or other user interface) may be expandable or collapsible to display or hide particular information.

Also, to provide an example map visualization, the map service module 72 can retrieve a map corresponding to one or more of the selected POIs (if one has not previously been retrieved), and the POI detail interface module 92 can generate, as part of the POI detail interface, a user interface incorporating the retrieved map, preferably displaying the selected POIs thereon (such as with appropriate icons, pins, etc.). A subset of the selected POIs may be viewable at the same time, which subset may be updated as the user interacts with the map interface (e.g., scrolling, zooming, etc.). The displayed selected POIs may be selectable from the map and/or from other formatted portions of the POI detail interface. Preferably, additionally selected POIs from the matching POIs can be added to the generated map. Previously selected POIs may also be removable (de-selected) from the map in some embodiments.

Additionally, upon receiving a request for categorized tips (step 152), for instance in response to receiving the POI selection or in response to receiving a further selection relating to a particular POI in the first user interface portion, the information retrieval module 70 searches for and retrieves previously extracted tips and associated categories from the POI KB that are associated with the selected POI(s). It is also contemplated that this search for extracted tips and semantic categories can occur at least in part during the initial search for matching POIs, and stored in memory for later retrieval by the information retrieval module 70 in response to the received POI selection or further selection.

The POI detail interface module generates and transmits, as part of the POI detail interface, a second user interface portion interactively presenting the retrieved tips associated with the selection POI(s), sorted by their associated semantic categories (step 154). This second user interface portion may be displayed on a separate screen (e.g., separate page, tab, or document) from the first user interface portion, may be concurrently displayed with the first user interface portion, may be incorporated within or combined with the first user interface portion, may be superimposed on the first user interface portion, or may otherwise be presented. Any suitable transition (or none at all) between the first user interface portion and the second user interface portion may be provided.

Figure 7:
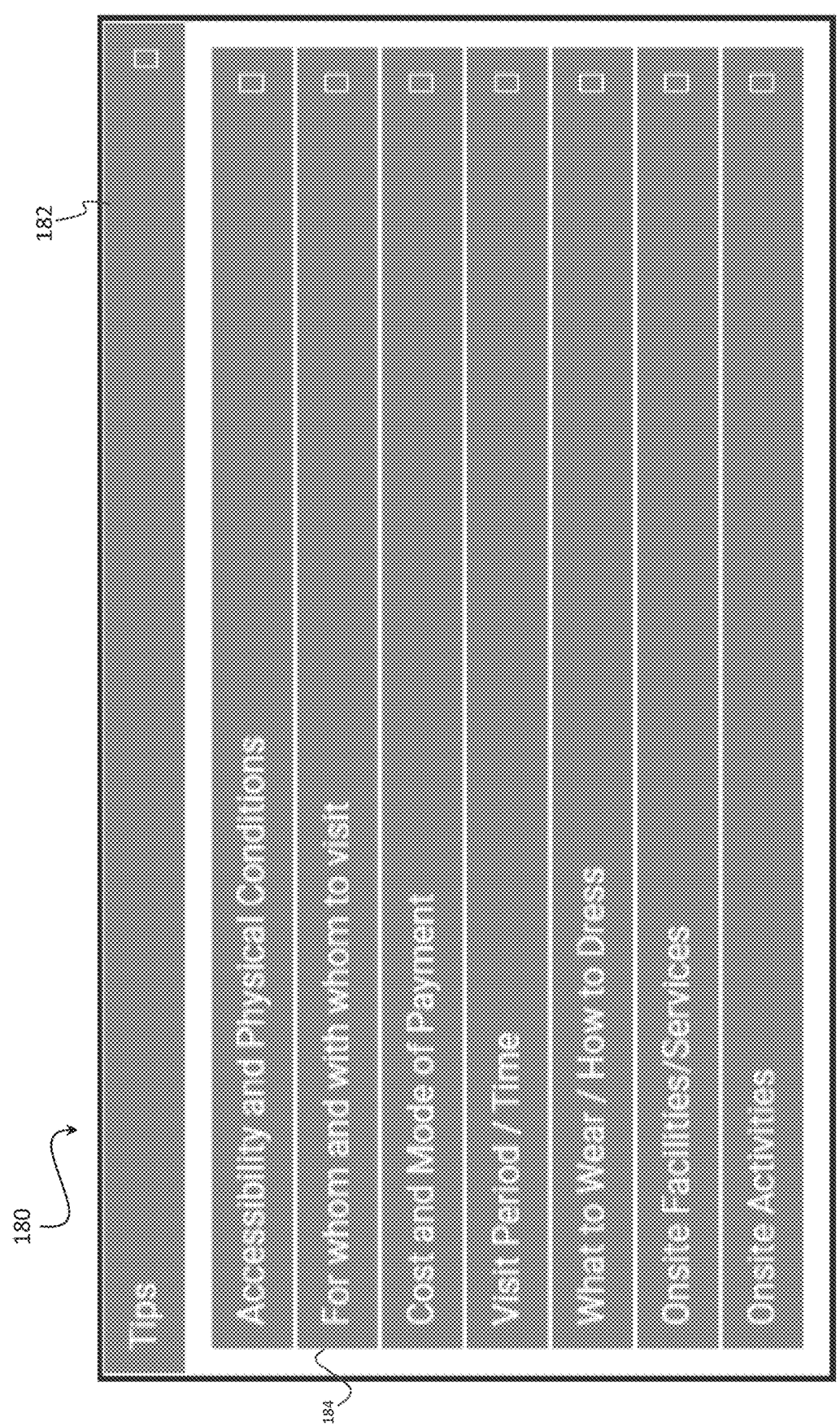
FIG. 7 shows an example screenshot for an expandable/collapsible user interface portion including retrieved POI tips and semantic categories in response to a POI query.
Figure 8:
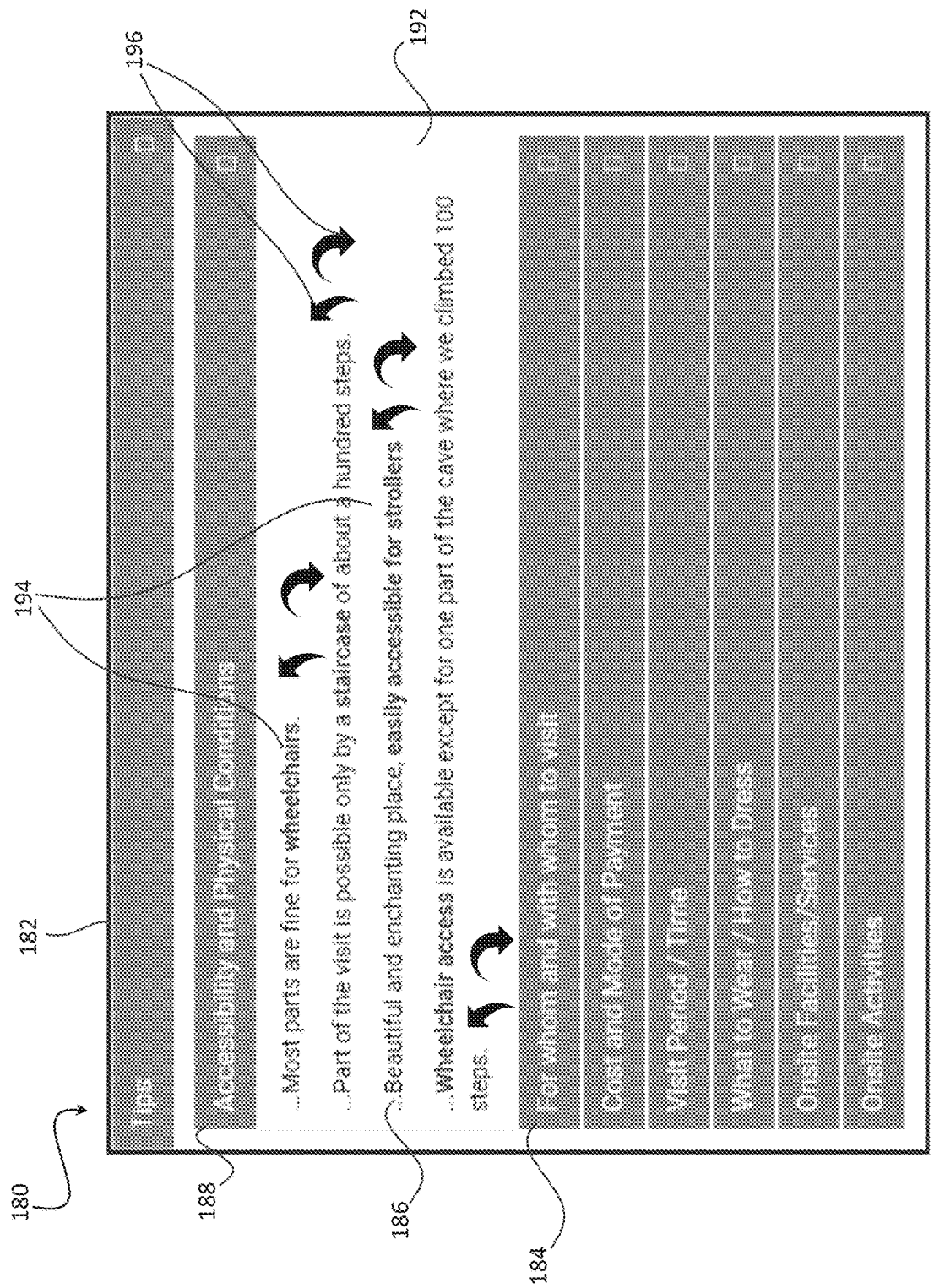
FIG. 8 shows the expandable/collapsible user interface portion of FIG. 7, in which a displayed first semantic category is selected and expanded to display associated retrieved POI tip occurrences within text snippets, where tip targets within the tip occurrences are emphasized by a unique (bold) font.
Figure 9:
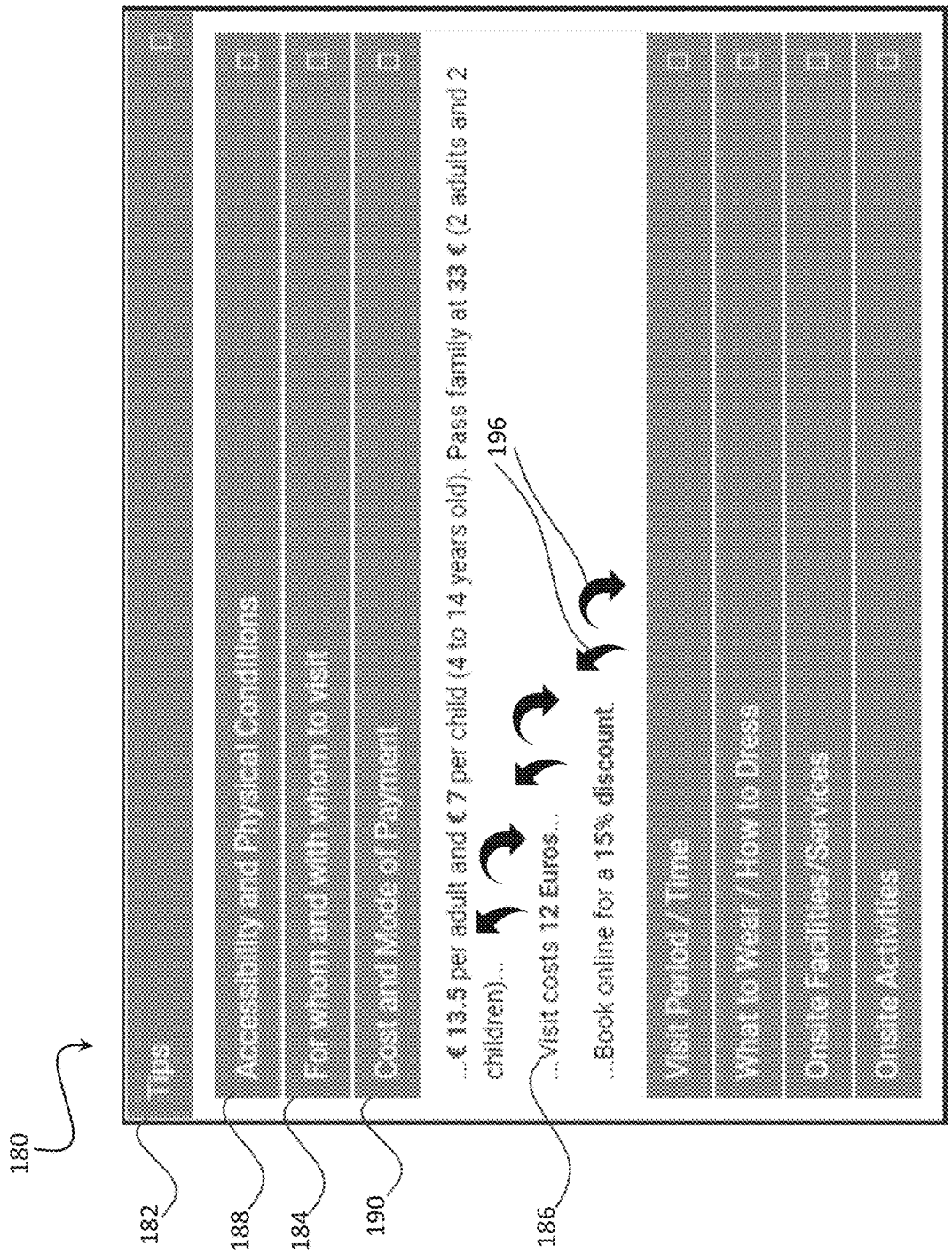
FIG. 9 shows the expandable/collapsible user interface portion of FIG. 7, in which a second semantic category is selected and expanded to display associated retrieved POI tip occurrences within text snippets, and where the first displayed semantic in FIG. 8 is collapsed.

In some example embodiments, the second user interface portion is embodied in a second panel that is generated and transmitted to the user, preferably along with the first panel (and may be combined with the first panel in some embodiments). FIGS. 7-9 show a second panel 180 provided as a section bar in three different states according to an example embodiment. This second panel section bar 180 can also be incorporated in the POI matching interface and/or in the POI detail interface.

Preferably, the second panel 180 is configured to initially hide from view the retrieved POI tips and associated semantic categories until selected by the user. For instance, the second panel 180 can initially be collapsed, and then expand at least partially upon selection of an expandable/collapsible section bar 182, such as a "Tips" section bar, in the second panel.

The second panel 180 displays the retrieved POI tips as corresponding collapsible/expandable panels to users. Preferably, collapsible/expandable panels are provided for each retrieved tip category associated with the selected POI. Only tip categories that have instances in the reviews of the selected POI are preferably displayed as collapsible/expandable panels, though it is also contemplated to include a null, greyed, or blank tip category to indicate that no information is available for a particular category.

For example, in the panel 180 shown in FIG. 7 for the selected POI Grotte de Choranche, semantic tip category panels 184 are displayed from among those provided in the tip classes 76 (FIG. 3), including: Accessibility and Physical Conditions; For whom and with whom to visit; Cost and Mode of Payment; Visit Period/Time; What to Wear/How to Dress; Onsite Facilities/Services; and Onsite Activities. In this example, no tip was previously automatically extracted for the selected POI in the semantic tip category What to Bring shown in FIG. 3, and thus a corresponding collapsible/expandable panel is omitted in the example second panel 180 in FIGS. 7-9.

As shown in FIG. 7, the semantic tip categories 184 are initially displayed as collapsed section bars. Preferably, a user can then directly access a specific displayed category of tips by making a tip category selection, e.g., by selecting (such as clicking) the corresponding panel. In response to receiving the tip category selection (step 156) (FIG. 6), the associated tip category panel 184 is expanded to reveal one or more associated tip occurrences (tips) 186 (step 158). If thereafter a new tip category selection is made (step 160), the list of tips can be, but need not be, removed from view (step 162), and a new list of tips in the newly selected category can be displayed (step 164).

For example, FIG. 8 shows the user interface portion (second panel) 180 of FIG. 7, in a state where a tip category panel 188 corresponding to tip category "Accessibility and Physical Conditions" is selected from among the tip category panels 184 and expanded. FIG. 9, on the other hand, shows the user interface portion (panel) 180 of FIG. 7, in a state where a tip category panel 190 corresponding to tip category "Cost and Mode of Payment" selected and expanded, and with the "Accessibility and Physical Conditions" 186 collapsed. Panels 184 corresponding to displayed semantic tip categories can be configured to automatically collapse upon selection of a different tip category panel, remain expanded unless collapsed by a user, collapse unless pinned by a user, or collapse or expand in other ways. Preferably, as mentioned the complete second panel 180 can likewise be collapsed (e.g., folded), such as to a single section bar (e.g., the "Tips" section bar 182) to free UI space for other information, such as other POI information.

Referring again to FIG. 8, the (expanded) section panel for the selected semantic category "Accessibility and Physical Conditions" provides a tip occurrence list view, e.g., a window or cell 192, revealing categorized tips 186 automatically extracted from the free-text reviews of the selected POI associated with (and preferably indexed in the POI KB 64 with) the semantic category Accessibility and Physical Conditions (or associated semantic category in the POI KB, if the displayed category names vary from the stored category names).

As further shown in FIG. 8, upon selection of the semantic category "Accessibility and Physical Conditions," the associated tip occurrences 186 preferably are at least initially displayed in the tip occurrence list view 192 in the form of text snippets. A text snippet as used herein is a displayed portion (e.g., string) of text, which may have a token (e.g., word) length or count that is equal to or smaller than the complete POI free-text review from which the tip is extracted, and in which at least one tip target 198 (tip core element) is emphasized on the display. An example emphasis for the tip target(s) 198 includes known text emphasis methods, such as bolding, highlighting, alternate color, blinking, enlarging, etc.

The length and content of text snippets may be selected and displayed based on various criteria. In some example embodiments, the text snippets may be the complete sentences in which the tip target 198 occurs. As another example, the text snippet may be a text window that includes the tip target 198, and a number (n, where n can be a customizable parameter set by the user or in the system 20) of words or other tokens (or meaningful words or tokens) before and after the tip target. Ellipses or other indicators may be provided to indicate omitted text.

A tip occurrence list view 192 can, but need not, include a maximum size (absolute or proportional) for text display, which size may be customizable using methods that will be apparent to those of ordinary skill in the art. If a maximum size is thus provided, the tip occurrence list view 192 preferably becomes scrollable when the maximum size is exceeded.

The example list of tip occurrences displayed in a particular category in the tip occurrence list view 192 may be automatically sorted, or selectively sorted, by one or more criteria. As a nonlimiting example, if a timestamp is generated during the source POI free-text review and stored with this review, the tip occurrences can be sorted by the timestamp after retrieval from the POI KB 64. For instance, the newest (or oldest) tip occurrences may be displayed first.

Preferably, the example user interface, such as the POI matching interface, the first user interface portion of the POI detail interface, or the second user interface portion of the POI detail interface, includes one or more user feedback or control features, including but not limited to icons, widgets, or other controls. Any suitable interface that can allow the user to access and/or select/deselect the particular type of information they are interested in can be provided. Such controls can be provided, as a nonlimiting example, as directly accessible controls and/or via a menu. Such controls or menus can be accessed, for instance, by selecting suitable provided widgets or icons on (or near) one or more tip category panels 184 and/or section bars 182 (e.g., at a corner of the tip category or section bar, or elsewhere) and/or on one or more displayed tips 186 in the tip occurrence list view.

Such controls can allow a user, for instance, to selectively order or re-order the displayed tip occurrence according to the timestamp information, as disclosed above. Alternatively or additionally, controls may be provided to re-order the list of tip occurrences, for instance, by a relevance score. An example relevance score is the prediction score with which the tip identifier has predicted a tip occurrence and its association with the selected semantic category. Other criteria for selectively ordering the displayed tip occurrences are possible.

In example embodiments, receiving a selection (e.g., click) of a displayed tip occurrence 186 (step 166) (FIG. 6) expands the selected text snippet to show the full POI review text, or at least an expanded portion (for instance, up to a predetermined length) of the POI review text (step 168). Additional information relating to the selected tip occurrences 186 can also be provided, such as but not limited to timestamp and/or author information. Preferably, the displayed expanded POI review text can then be selected again to cause a return to the text snippet view (e.g., as shown in FIGS. 8-9). Other controls, such as "collapse all" can also be provided.

In example embodiments, in the tip occurrence list view 192 of the (expanded) second user interface portion shown in FIGS. 8-9, icons, widgets, or other interactive controls 196 may be provided with one or more displayed text snippets or expanded tips to receive user feedback regarding the displayed tips (tip feedback). For instance, interactive controls may be provided with which users can "upvote" or "downvote" or otherwise rate the tip occurrence in which the tip snippet resides, e.g., based on its accuracy and/or importance. In the example controls 196 shown in FIGS. 8-9, up arrows and down arrows are shown, but other displayed icons or controls, such as thumbs-up/down, check/uncheck, happy/sad face, "X" or "0", "Like" or "Dislike," a sliding rating scale, a form field for entering the feedback or any other indicators to convey upvoting or downvoting or otherwise rating or providing tip feedback regarding the user's view of the relevance of the particular displayed tip. "Relevance" can generally also refer to perceived quality, usefulness, user appreciation, or any other criterion for user assessment of the particular tip.

Figure 10:
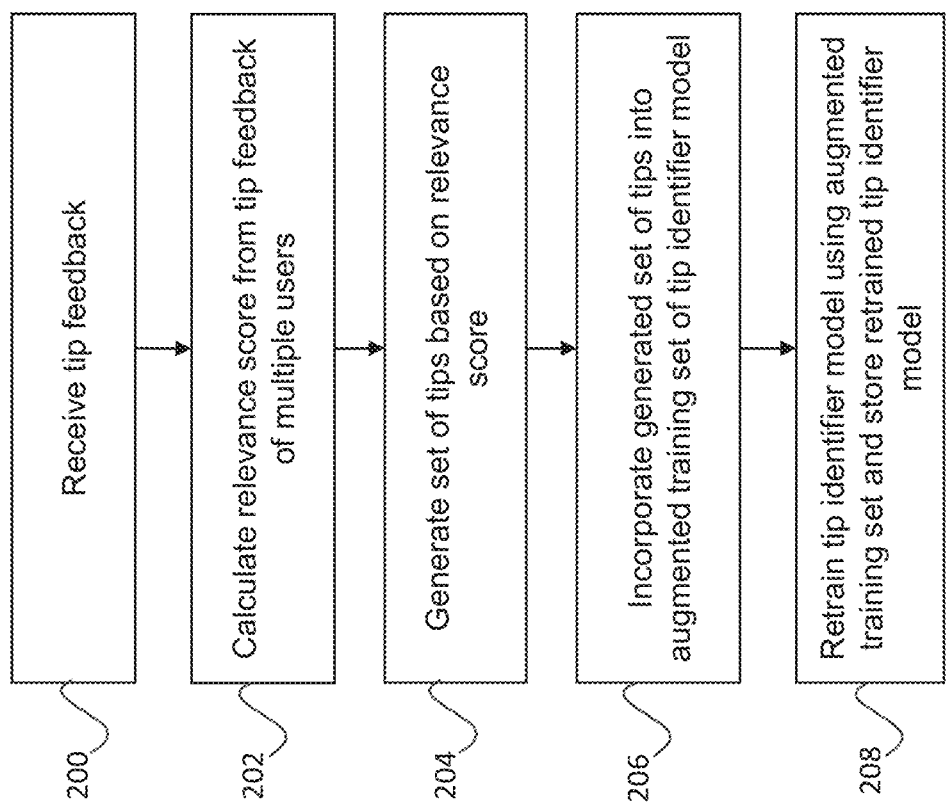
FIG. 10 shows an example method for retraining a natural language processing model based on user feedback from displayed POI tip occurrences.

FIG. 10 shows an example method for employing tip feedback. The tip feedback is provided by a user, such as via any of the example interactive controls disclosed above (or others) (step 200). This feedback is received by the front end 80, for instance by the POI detail interface module 92.

A relevance score is then determined, e.g., calculated, based on an aggregated users' relevance score (step 202). The relevance score can be computed, for instance, by the tip identifier module 68 or other back-end 62 or front-end 80 module, from multiple users' collective or aggregate feedback received by the front-end (as a nonlimiting example, from received upvoting or downvoting actions, or by using other user feedback). Any suitable method can be used to calculate this relevance score from the received feedback. As a nonlimiting example, upvoting can increment an appreciation score (an example or component of a relevance score) by a particular amount, while downvoting can decrement the appreciation score by the same or a different amount. As another example, feedback rating scores received either directly (e.g., via a form field or sliding scale) or indirectly (e.g., by assigning downvotes to a zero and upvotes to 10 or some other number) can be averaged or otherwise combined to provide a relevance score.

Individual feedback (e.g., individual votes or scores) can be, but need not be, weighted when determining relevance scores. Feedback can also be selectively considered or omitted from consideration in the determination. For instance, older feedback may be given less weight than more recent feedback. As another example, to prevent excessive, inaccurate, or malignant upvoting/downvoting of tips, a limitation per POI tip may be set, e.g., based on a user's unique ID (e.g., an account ID if logged in, and/or a user's IP address if not). It is possible that more than one relevance score could be determined for different applications.

The determined relevance score(s) can be used in various ways according to example methods. For instance, individual tips 186 displayed in the tip occurrence list view 192 for a particular semantic category can be sorted in decreasing order of their determined relevance score automatically. Alternatively, each of the tip category section bars 184 may include one or more controls to selectively re-order the list of tip occurrences based on the determined relevance score. It is also contemplated that tip occurrences having a relevance score below a set threshold may be omitted from the display (e.g., in a reduced view, or even in an expanded view).

The relevance score can also in some example embodiments can be combined with other determined relevance scores, such as that based on a prediction score as described above, with any suitable weights assigned to each score, to determine a combined relevance score. This combined relevance score can alternatively or additionally be used to automatically or selectively sort displayed tip occurrences 186 as disclosed herein.

Preferably, on a regular or semi-regular basis, POI tips generated (e.g., identified) by the tip identifier model that receive a determined relevance score (e.g., based on user feedback as described above) greater than a threshold (or based on other criteria relating to the determined relevance score), can be selected (step 204) and incorporated as positive examples to an example augmented training dataset for retraining the example tip identifier model. The example tip identifier model may then be regularly retrained on the so-augmented training dataset (step 208).

For instance, after a predetermined amount of new POI tips (that is, those not yet in the (preferably continuously evolving) training dataset) have been received, a predetermined number of the identified POI tips generated within the new set of POI tips having the highest determined relevance scores can be incorporated into the augmented training set. If an unusual number of identified POI tips receive low relevance scores, a relevance score cutoff may be used to avoid incorporation of low-scoring identified POI tips. As another example, after a certain number of identified POI tips receive a relevance score exceeding a certain threshold, these identified POI tips are incorporated into the augmented training set. The tip identifier model can then be retrained using the augmented training set, e.g., using the methods disclosed herein.

Methods and systems are disclosed herein for providing information to a user relating to a point-of-interest (POI). An example method comprises: receiving a query via a communication network; retrieving, using a processor, information from a data storage relating to at least one POI based on the received query, wherein the retrieved information comprises a set of retrieved POI tips relating to the at least one POI, each of the set of retrieved POI tips being previously extracted from POI free-text reviews and respectively associated in the data storage with one or more semantic categories based on a predefined tip ontology; generating, using the processor, a user interface interactively displaying the retrieved POI tips and the semantic categories associated with each of the retrieved POI tips, wherein the displayed POI tips are sorted by their associated displayed semantic categories; and transmitting the generated user interface to a computing device of the user via the communication network for display on the computing device.

In particular embodiments, and in combination with any of the above features, each of the displayed semantic categories in the user interface is selectable to display one or more of the retrieved POI tips associated with the respective displayed semantic category. In particular embodiments, and in combination with any of the above features, each of the displayed semantic categories comprises an expandable/collapsible widget. In particular embodiments, and in combination with any of the above features, each of the displayed POI tips comprises a text snippet including a tip target. In particular embodiments, and in combination with any of the above features, the text snippet further comprises either a source sentence from the POI free-text review from which the displayed POI tip was extracted or a predefined number of words surrounding the tip target from the POI free-text review from which the displayed POI tip was extracted; wherein the text snippet is selectable to display an expanded portion of the POI free-text review from which the displayed POI tip was extracted; and wherein an appearance of the displayed tip target is visibly distinct from other portions of the displayed text snippet. In particular embodiments, and in combination with any of the above features, the text snippet is further selectable to display at least one of a date or author of the POI free-text review from which the displayed POI tip was extracted.

In particular embodiments, and in combination with any of the above features, the user interface comprises: a first user interface portion displaying the retrieved information other than the retrieved POI tips and the semantic categories associated with each of the retrieved POI tips; and a second user interface portion interactively displaying the retrieved POI tips and the semantic categories associated with each of the retrieved POI tips.

In particular embodiments, and in combination with any of the above features, the retrieved information displayed by the first user interface portion comprises standard POI information. In particular embodiments, and in combination with any of the above features, wherein the first user interface portion and the second user interface portion are concurrently displayed in the user interface; and wherein, in the second user interface portion, the retrieved POI tips and the semantic categories associated with each of the retrieved POI tips are initially hidden until the second user interface portion is selected.

In particular embodiments, and in combination with any of the above features, the second user interface portion comprises an expandable/collapsible widget. In particular embodiments, and in combination with any of the above features, the displayed tips within each of the associated displayed semantic In particular embodiments, and in combination with any of the above features, the user interface further comprises an interactive widget for receiving feedback for one or more of the displayed tips within each of the associated displayed semantic categories. In particular embodiments, and in combination with any of the above features, the tips within a category are further sortable by a relevance score that is calculated at least partially based on the received feedback. In particular embodiments, and in combination with any of the above features, the data storage comprises a POI knowledge base (KB).

In particular embodiments, and in combination with any of the above features, the method further comprises: retrieving, using the processor, a plurality of POI free-text reviews; identifying tip occurrences in each of the retrieved plurality of POI free-text reviews using a natural language processing model; associating the identified tip occurrences with the at least one stored semantic category using the natural language processing model; and storing the identified tip occurrences and their association with the at least one stored semantic category to provide the extracted POI tips.

In particular embodiments, and in combination with any of the above features, the natural language processing model comprises a tip identifier model. In particular embodiments, and in combination with any of the above features, the tip identifier model comprises a neural network.

In particular embodiments, and in combination with any of the above features, the method further comprises, for each of the retrieved plurality of POI free-text reviews: preprocessing the POI free-text review to generate one or more input words; and feeding each of the generated one or more input words into the tip identifier model. In particular embodiments, and in combination with any of the above features, said associating comprises, for each of the one or more input words fed into the tip identifier model: generating, by the tip identifier model, a prediction score for each of the at least one stored semantic categories; and associating the input word with one or more of the at least one stored semantic categories based on the prediction score. In particular embodiments, and in combination with any of the above features, the displayed tips within each of the associated displayed semantic categories are sortable by one or more of a review date/time or a relevance score based on the prediction score.

In particular embodiments, and in combination with any of the above features, the method further comprises: defining and storing the tip ontology; creating training data from POI free-text reviews; training the tip identifier model using the created training data; and storing the trained tip identifier model.

In particular embodiments, and in combination with any of the above features, the method further comprises: receiving feedback for one or more of the displayed tips; calculating a relevance score for the one or more of the displayed tips at least partially based on the received feedback; selecting one or more of the identified tip occurrences based on the calculated relevance score; generating augmented training data including the selected one or more tip occurrences; and retraining the tip identifier model using the generated augmented training data.

In particular embodiments, and in combination with any of the above features, the feedback is received from an interactive widget in the user interface for one or more of the displayed tips within each of the associated displayed semantic categories. In particular embodiments, and in combination with any of the above features, the interactive widget comprises interactive upvoting/downvoting buttons.

Other embodiments disclosed herein provide systems for providing information to a user relating to a point-of-interest (POI) comprising: a communication interface; a back-end including a processor and a memory, the back-end comprising: a knowledge base; a tip identifier module configured to identify tip occurrences in each of a plurality of POI free-text reviews using a natural language processing model, associate the identified tip occurrences with at least one semantic category based on a predefined tip ontology using the natural language processing model, and store the identified tip occurrences and their association with the at least one semantic category in the knowledge base; and an information retrieval module configured to retrieve information from the knowledge base relating to at least one POI in response to a received query, wherein the retrieved information comprises a set of the identified tip occurrences relating to the at least one POI and their respective associated semantic categories. A front-end including the processor and memory comprises: a POI query interface module configured to receive the query via the communication interface; and a POI detail interface module configured to generate and transmit a user interface interactively displaying the retrieved POI tips and the semantic categories associated with each of the retrieved POI tips, wherein the displayed POI tips are sorted by their associated displayed semantic categories.

In particular embodiments, and in combination with any of the above features, the retrieved information from the information retrieval module comprises a set of matching POIs corresponding to the received query, the set of matching POIs including the at least one POI; wherein, for each of the at least one POI, the retrieved information from the information retrieval module further comprises standard POI information relating to the at least one POI.

In particular embodiments, and in combination with any of the above features, the user interface generated by the POI detail interface module further interactively displays the standard POI information in a first user interface portion of the user interface. In particular embodiments, and in combination with any of the above features, the user interface generated by the POI detail interface module displays the retrieved POI tips and the semantic categories associated with each of the retrieved POI tips in a second user interface portion of the user interface in which the retrieved POI tips and the semantic categories associated with each of the retrieved POI tips are initially hidden until the second user interface portion is selected.

In particular embodiments, and in combination with any of the above features, the front-end further comprises: a matching POI interface module configured to generate and transmit a matching POI user interface interactively displaying at least a portion of the retrieved set of matching POIs, the displayed matching POIs being selectable; wherein the POI detail interface module is configured to generate and transmit the user interface for the at least one POI in response to the at least one POI being selected in the matching POI user interface.

In particular embodiments, and in combination with any of the above features, at least one of the first user interface portion, the second user interface portion, or the matching POI interactive user interface is collapsible and expandable.

In particular embodiments, and in combination with any of the above features, the back-end further comprises: a map service module configured to generate a map interface comprising a visualization of one or more of the matching POIs in the matching POI user interface.

In particular embodiments, and in combination with any of the above features, wherein the second user interface portion further comprises, for each of the displayed POI tips, an interactive widget for receiving feedback for the displayed POI tip. In particular embodiments, and in combination with any of the above features, the tip identifier module is further configured to: calculate a relevance score for the one or more of the displayed tips at least partially based on the received feedback; select one or more of the identified tip occurrences based on the calculated relevance score; generate augmented training data including the selected one or more tip occurrences; and retrain the natural language processing model using the generated augmented training data.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for providing information to a user relating to a point-of-interest (POI), the method comprising:
    receiving a query via a communication network retrieving, using a processor,
    information from a data storage relating to at least one POI based on the received query, wherein the retrieved information comprises a set of retrieved POI tips relating to factual information of the at least one POI, each of the set of retrieved POI tips being previously extracted using a natural language processing model from POI free-text reviews associated with one or more input words, which are reviews of POIs provided in a free-text structure, and respectively associated in the data storage with one or more semantic categories based on a predefined tip ontology, where (i) each extracted POI tip is associated with an occurrence of an identified tip in the corresponding POI free-text review using the natural language processing model and the identified tip's association with the at least one semantic category; and (ii) each semantic category of the predefined tip ontology organizes POI tips by type and is associated with a prediction score generated by a tip identifier model based on the one or more input words of the corresponding POI free-text review; generating, using the processor, a user interface interactively displaying the retrieved POI tips and the semantic categories associated with each of the retrieved POI tips, wherein the displayed POI tips are sorted by their associated displayed semantic categories; and transmitting the generated user interface to a computing device of the user via the communication network for display on the computing device.

2. The method of claim 1, wherein each of the displayed semantic categories in the user interface is selectable to display one or more of the retrieved POI tips associated with the respective displayed semantic category.

3. The method of claim 1, wherein each of the displayed POI tips comprises a text snippet including a tip target;
    wherein the text snippet further comprises either a source sentence from the POI free-text review from which the displayed POI tip was extracted or a predefined number of words surrounding the tip target from the POI free-text review from which the displayed POI tip was extracted;
wherein the text snippet is selectable to display an expanded portion of the POI free-text review from which the displayed POI tip was extracted; and
wherein an appearance of the displayed tip target is visibly distinct from other portions of the displayed text snippet.

4. The method of claim 3, wherein the text snippet is further selectable to display at least one of a date or author of the POI free-text review from which the displayed POI tip was extracted.

5. The method of claim 1, wherein the user interface comprises:
a first user interface portion displaying the retrieved information other than the retrieved POI tips and the semantic categories associated with each of the retrieved POI tips; and
a second user interface portion interactively displaying the retrieved POI tips and the semantic categories associated with each of the retrieved POI tips.

6. The method of claim 5,
wherein the first user interface portion and the second user interface portion are concurrently displayed in the user interface; and
wherein, in the second user interface portion, the retrieved POI tips and the semantic categories associated with each of the retrieved POI tips are initially hidden until the second user interface portion is selected.

7. The method of claim 6, wherein the user interface further comprises an interactive widget for receiving feedback for one or more of the displayed tips within each of the associated displayed semantic categories.

8. The method of claim 7, wherein the tips within a semantic category are further sortable by a relevance score that is calculated at least partially based on the received feedback.

9. The method of claim 1, further comprising:
retrieving, using the processor, a plurality of POI free-text reviews;
identifying tip occurrences in each of the retrieved plurality of POI free-text reviews using the natural language processing model;
associating the identified tip occurrences with the at least one stored semantic category using the natural language processing model; and
storing the identified tip occurrences and their association with the at least one stored semantic category to provide the extracted POI tips.

10. The method of claim 1, wherein the natural language processing model comprises a neural network.

11. The method of claim 9, further comprising, for each of the retrieved plurality of POI free-text reviews:
preprocessing the POI free-text review to generate one or more input words;
feeding each of the generated one or more input words into the tip identifier model;
wherein said associating comprises, for each of the one or more input words fed into the tip identifier model:
generating, by the tip identifier model, the prediction score for each of the at least one stored semantic categories; and
associating the input word with one or more of the at least one stored semantic categories based on the prediction score.

12. The method of claim 1, wherein the displayed tips within each of the associated displayed semantic categories are sortable by one or more of a review date/time or a relevance score based on the prediction score.

13. The method of claim 1, further comprising:
receiving feedback for one or more of the displayed tips;
calculating a relevance score for the one or more of the displayed tips at least partially based on the received feedback;
selecting one or more of the identified tip occurrences based on the calculated relevance score;
generating augmented training data including the selected one or more tip occurrences; and
retraining the tip identifier model using the generated augmented training data.

14. A system for providing information to a user relating to a point-of-interest (POI), the system comprising:
a communication interface;
a back-end including a processor and a memory, the back-end comprising:
a knowledge base;
a tip identifier module configured to: (i) retrieve a plurality of POI free-text reviews, which are reviews of POIs provided in a free-text structure; (ii) identify tip occurrences in each of the POI free-text reviews, using a natural language processing model, each identified tip occurrence having factual information relating to a respective POI, (iii) associate the identified tip occurrences with at least one semantic category based on a predefined tip ontology using the natural language processing model, where each semantic category of the predefined tip ontology organizes POI tips by type, and (iv) store the identified tip occurrences and their association with the at least one semantic category in the knowledge base; and
an information retrieval module configured to retrieve information from the knowledge base relating to at least one POI in response to a received query, wherein the retrieved information comprises a set of the identified tip occurrences relating to the at least one POI and their respective associated semantic categories;
a front-end including the processor and memory, the front-end comprising:
a POI query interface module configured to receive the query via the communication interface; and
a POI detail interface module configured to generate and transmit a user interface interactively displaying the retrieved POI tips and the semantic categories associated with each of the retrieved POI tips, wherein the displayed POI tips are sorted by their associated displayed semantic categories;
wherein the tip identifier module preprocesses the retrieved POI free-text reviews to generate one or more input words;
wherein the associating the identified tip occurrences with at least one semantic category comprises:
generating a prediction score for each of the at least one stored semantic categories for the one or more input words; and
associating the one or more input words with one or more of the at least one stored semantic categories based on the prediction score.

15. The system of claim 14,
wherein the retrieved information from the information retrieval module comprises a set of matching POIs corresponding to the received query, the set of matching POIs including the at least one POI;

wherein, for each of the at least one POI, the retrieved information from the information retrieval module further comprises standard POI information relating to the at least one POI;
wherein the user interface generated by the POI detail interface module further interactively displays the standard POI information in a first user interface portion of the user interface;
wherein the user interface generated by the POI detail interface module displays the retrieved POI tips and the semantic categories associated with each of the retrieved POI tips in a second user interface portion of the user interface in which the retrieved POI tips and the semantic categories associated with each of the retrieved POI tips are initially hidden until the second user interface portion is selected.

16. The system of claim 15,
wherein the front-end further comprises:
a matching POI interface module configured to generate and transmit a matching POI user interface interactively displaying at least a portion of the retrieved set of matching POIs, the displayed matching POIs being selectable;
wherein the POI detail interface module is configured to generate and transmit the user interface for the at least one POI in response to the at least one POI being selected in the matching POI user interface.

17. The system of claim 16, wherein at least one of the first user interface portion, the second user interface portion, or the matching POI interactive user interface is collapsible and expandable.

18. The system of claim 16, wherein the back-end further comprises:
a map service module configured to generate a map interface comprising a visualization of one or more of the matching POIs in the matching POI user interface.

19. The system of claim 15,
wherein the second user interface portion further comprises, for each of the displayed POI tips, an interactive widget for receiving feedback for the displayed POI tip; and
wherein the tip identifier module is further configured to:
calculate a relevance score for the one or more of the displayed tips at least partially based on the received feedback;
select one or more of the identified tip occurrences based on the calculated relevance score;
generate augmented training data including a selected one or more tip occurrences; and
retrain the natural language processing model using the generated augmented training data.

20. A non-transitory computer-readable storage medium having executable instructions stored thereon that when executed cause a processor to perform a method comprising:
receiving a query via a communication network;
retrieving, using a processor, information from a data storage relating to at least one POI based on the received query, wherein the retrieved information comprises a set of retrieved POI tips relating to factual information of the at least one POI, each of the set of retrieved POI tips being previously extracted from POI free-text reviews, which are reviews of POIs provided in a free-text structure, and respectively associated in the data storage with one or more semantic categories based on a predefined tip ontology, where each semantic category of the predefined tip ontology organizes POI tips by type;
generating, using the processor, a user interface interactively displaying the retrieved POI tips and the semantic categories associated with each of the retrieved POI tips, wherein the displayed POI tips are sorted by their associated displayed semantic categories; and
transmitting the generated user interface to a computing device of the user via the communication network for display on the computing device;
wherein the method further comprises:
retrieving, using the processor, a plurality of POI free-text reviews;
preprocessing each of the retrieved POI free-text reviews to generate one or more input words;
identifying tip occurrences in each of the retrieved plurality of POI free-text reviews using a natural language processing model;
associating the identified tip occurrences with the at least one stored semantic category using the natural language processing model; and
storing the identified tip occurrences and their association with the at least one stored semantic category to provide the extracted POI tips;
wherein said associating the identified tip occurrences with the at least one stored semantic category comprises:
generating, by a tip identifier model, a prediction score for each of the at least one stored semantic categories for the one or more input words; and
associating the one or more input words with one or more of the at least one stored semantic categories based on the prediction score.

21. A method for providing information to a user relating to a point-of-interest (POI), the method comprising:
receiving a query via a communication network;
retrieving, using a processor, information from a data storage relating to at least one POI based on the received query, wherein the retrieved information comprises a set of retrieved POI tips relating to factual information of the at least one POI, each of the set of retrieved POI tips being previously extracted from POI free-text reviews, which are reviews of POIs provided in a free-text structure, and respectively associated in the data storage with one or more semantic categories based on a predefined tip ontology, where each semantic category of the predefined tip ontology organizes POI tips by type;
generating, using the processor, a user interface interactively displaying the retrieved POI tips and the semantic categories associated with each of the retrieved POI tips, wherein the displayed POI tips are sorted by their associated displayed semantic categories; and
transmitting the generated user interface to a computing device of the user via the communication network for display on the computing device;
wherein the retrieved POI tips relating to factual information of the at least one POI are retrieved from among a set of stored POI tips relating respectively to each of multiple POIs;
wherein each of the stored POI tips comprises one or more tokens and are previously extracted from among a larger set of tokens in a POI free-text review from a plurality of the POI free-text reviews;
wherein each of the set of stored POI tips is respectively associated in the data storage by POI tip with one or more semantic categories in the predefined tip ontology;

wherein each of the semantic categories in the predefined tip ontology is a category of the stored POI tips relating to multiple POIs; and wherein each of the POI tips is further associated in the data storage with a respective POI among the multiple POIs.

* * * * *